US012301779B2

(12) United States Patent
Tsurumi

(10) Patent No.: US 12,301,779 B2
(45) Date of Patent: May 13, 2025

(54) IMAGING CONTROL DEVICE AND IMAGING CONTROL METHOD

(71) Applicant: SONY GROUP CORPORATION, Tokyo (JP)

(72) Inventor: Shingo Tsurumi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 285 days.

(21) Appl. No.: 17/758,985

(22) PCT Filed: Jan. 8, 2021

(86) PCT No.: PCT/JP2021/000532
§ 371 (c)(1),
(2) Date: Jul. 18, 2022

(87) PCT Pub. No.: WO2021/153198
PCT Pub. Date: Aug. 5, 2021

(65) Prior Publication Data
US 2023/0077169 A1    Mar. 9, 2023

(30) Foreign Application Priority Data

Jan. 27, 2020 (JP) ................................. 2020-011031

(51) Int. Cl.
*H04N 13/246*   (2018.01)
*H04N 13/254*   (2018.01)

(52) U.S. Cl.
CPC ......... *H04N 13/246* (2018.05); *H04N 13/254* (2018.05)

(58) Field of Classification Search
CPC .......................... H04N 13/246; H04N 13/254

USPC .......................................................... 348/47
See application file for complete search history.

(56) References Cited

U.S. PATENT DOCUMENTS

2020/0077007 A1* 3/2020 Numata ................. H04N 23/73
2020/0364848 A1* 11/2020 Fujita ..................... B64D 47/08

FOREIGN PATENT DOCUMENTS

| JP | 2003-266349 A | 9/2003 |
| JP | 2009-065472 A | 3/2009 |
| JP | 2016-134816 A | 7/2016 |
| JP | 2017-509981 A | 4/2017 |
| WO | 2018/198634 A1 | 11/2018 |

OTHER PUBLICATIONS

International Search Report and Written Opinion of PCT Application No. PCT/JP2021/000532, issued on Mar. 30, 2021, 08 pages of ISRWO.

* cited by examiner

*Primary Examiner* — Amir Shahnami
(74) *Attorney, Agent, or Firm* — CHIP LAW GROUP

(57) ABSTRACT

An exposure control device of the present disclosure includes: a setting section that calculates a camera angle between a moving direction of an device including a plurality of stereo cameras and an optical axis direction of each of the plurality of stereo cameras, and sets an exposure frequency of each of the plurality of stereo cameras on the basis of a plurality of the camera angles; and an exposure controller that controls operations of the plurality of stereo cameras on the basis of a plurality of the exposure frequencies set by the setting section.

16 Claims, 24 Drawing Sheets

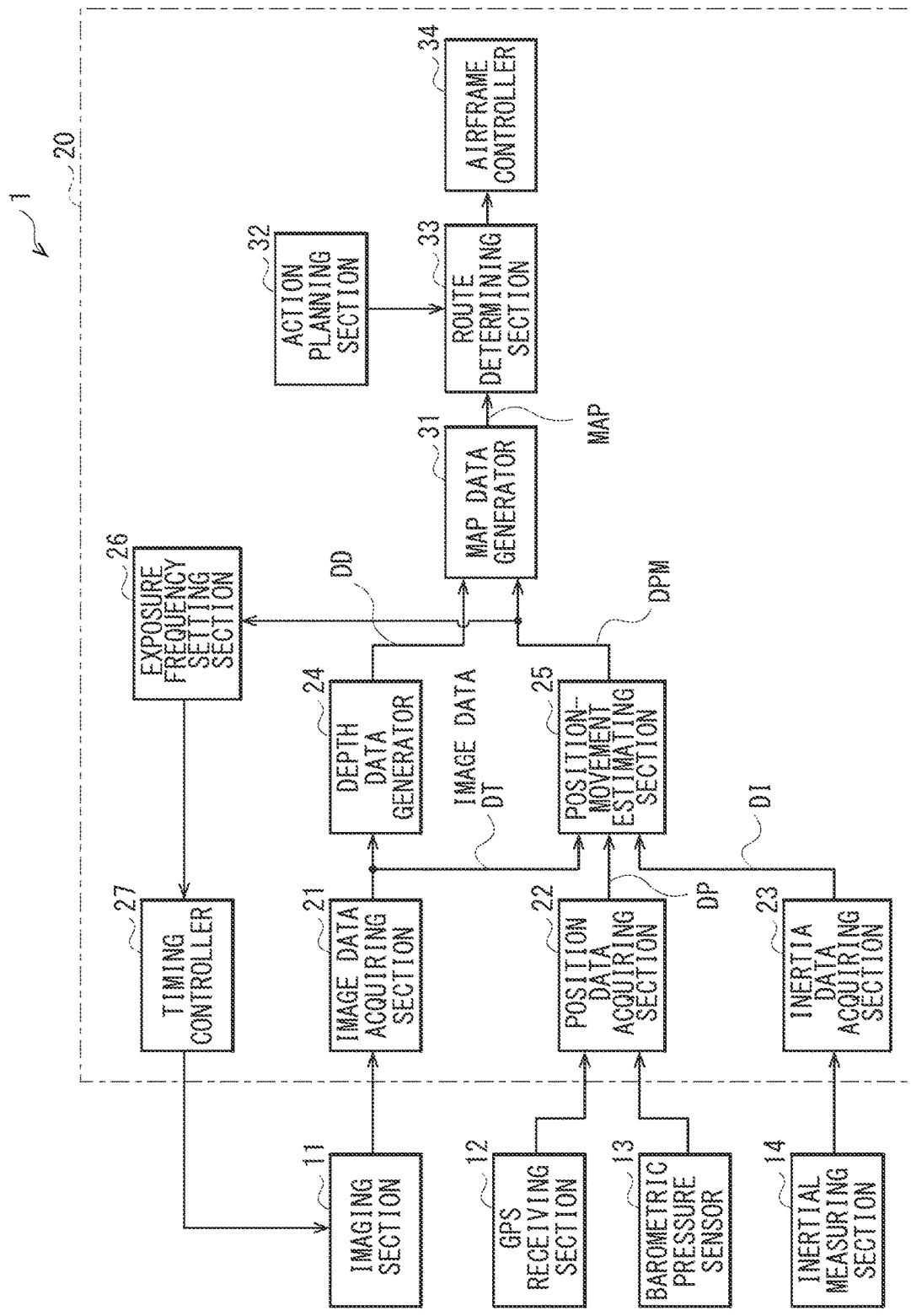
[FIG. 1]

[FIG. 2A]
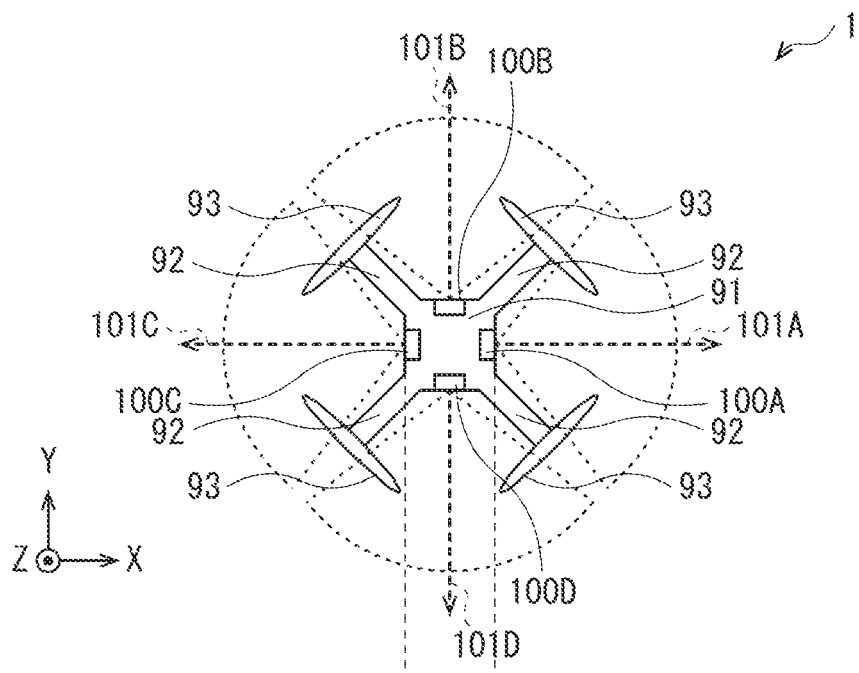
[FIG. 2B]
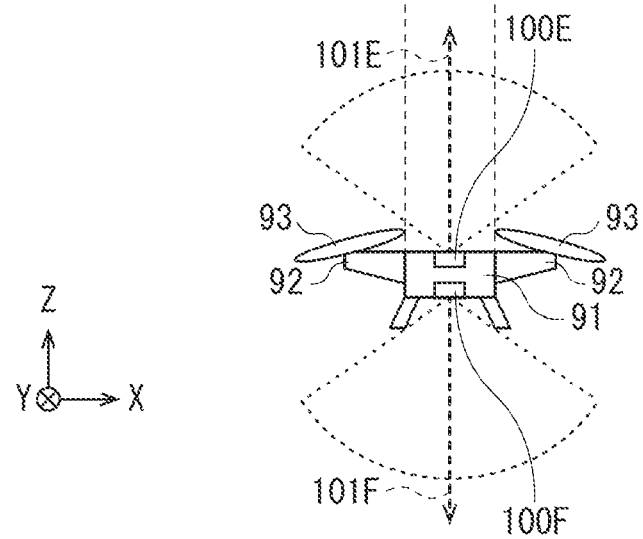

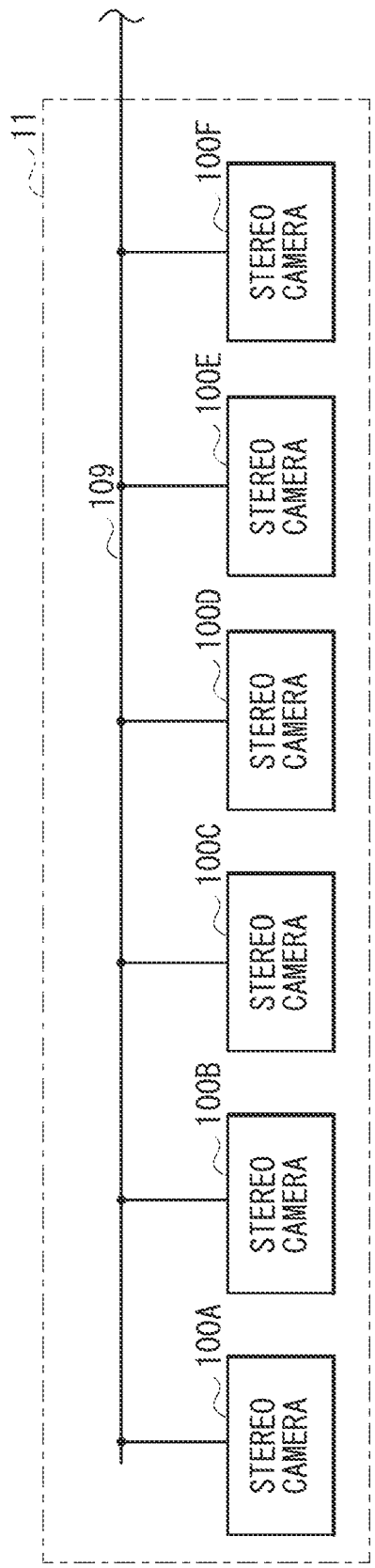
[FIG. 3]

[FIG. 4]
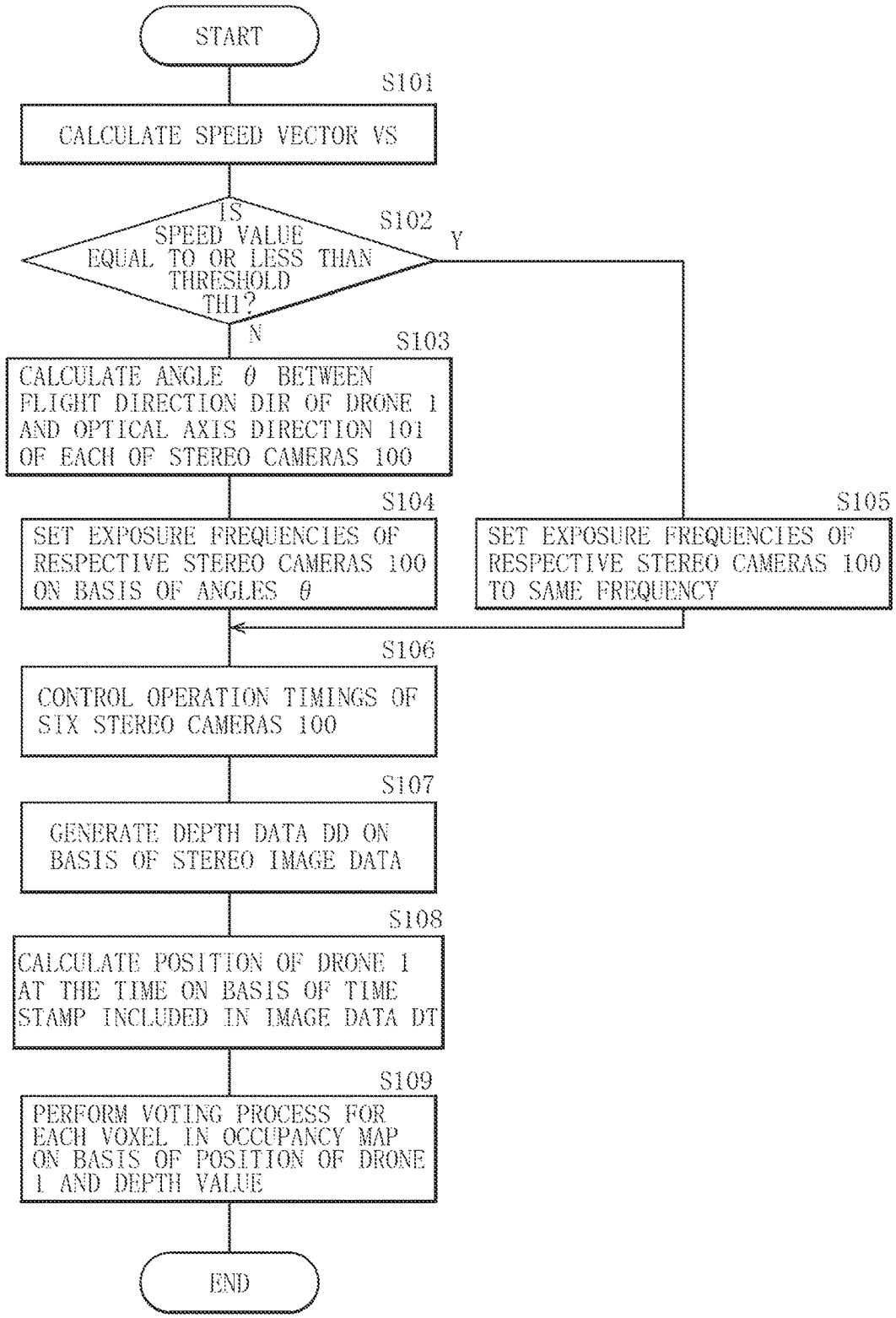

[FIG. 5]
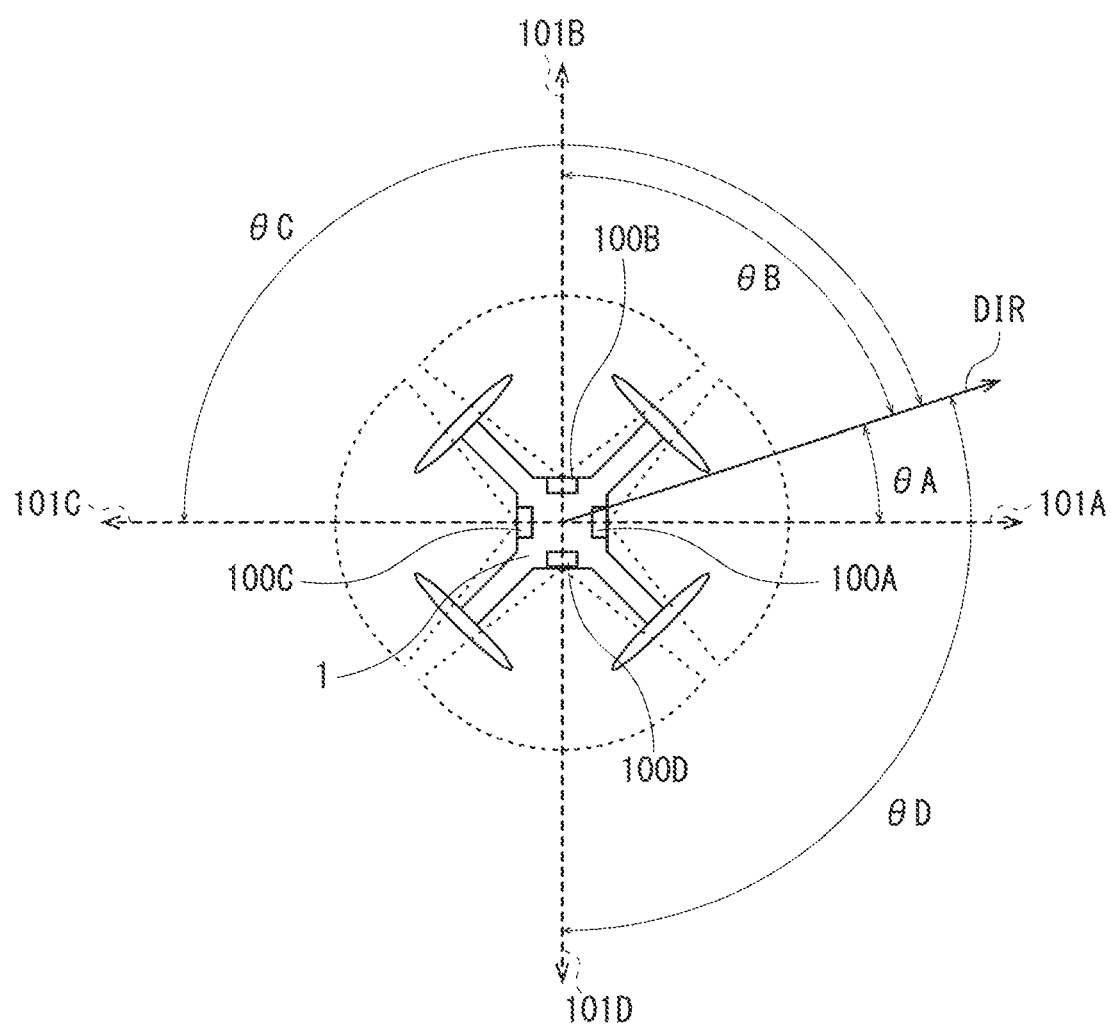

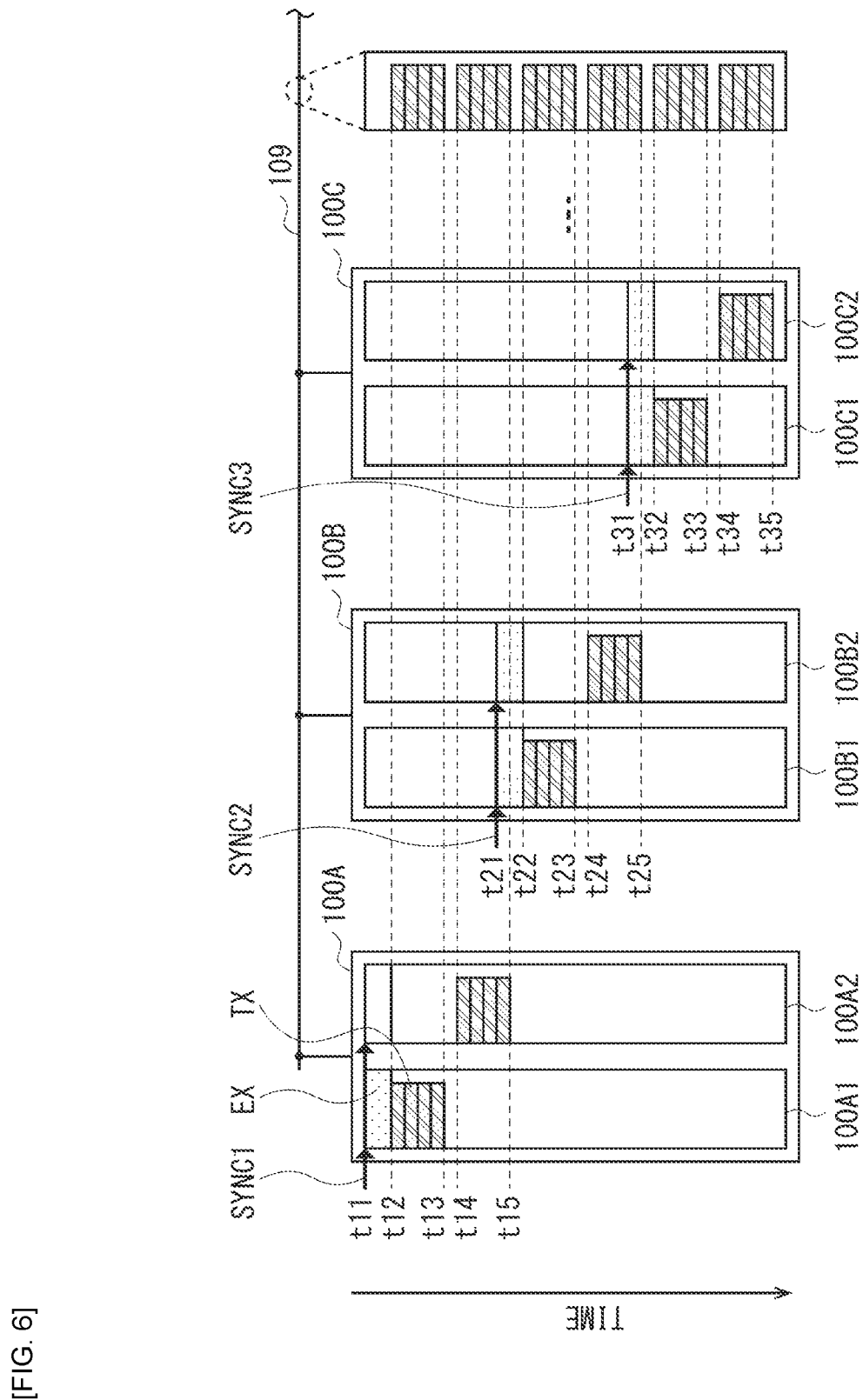
[FIG. 6]

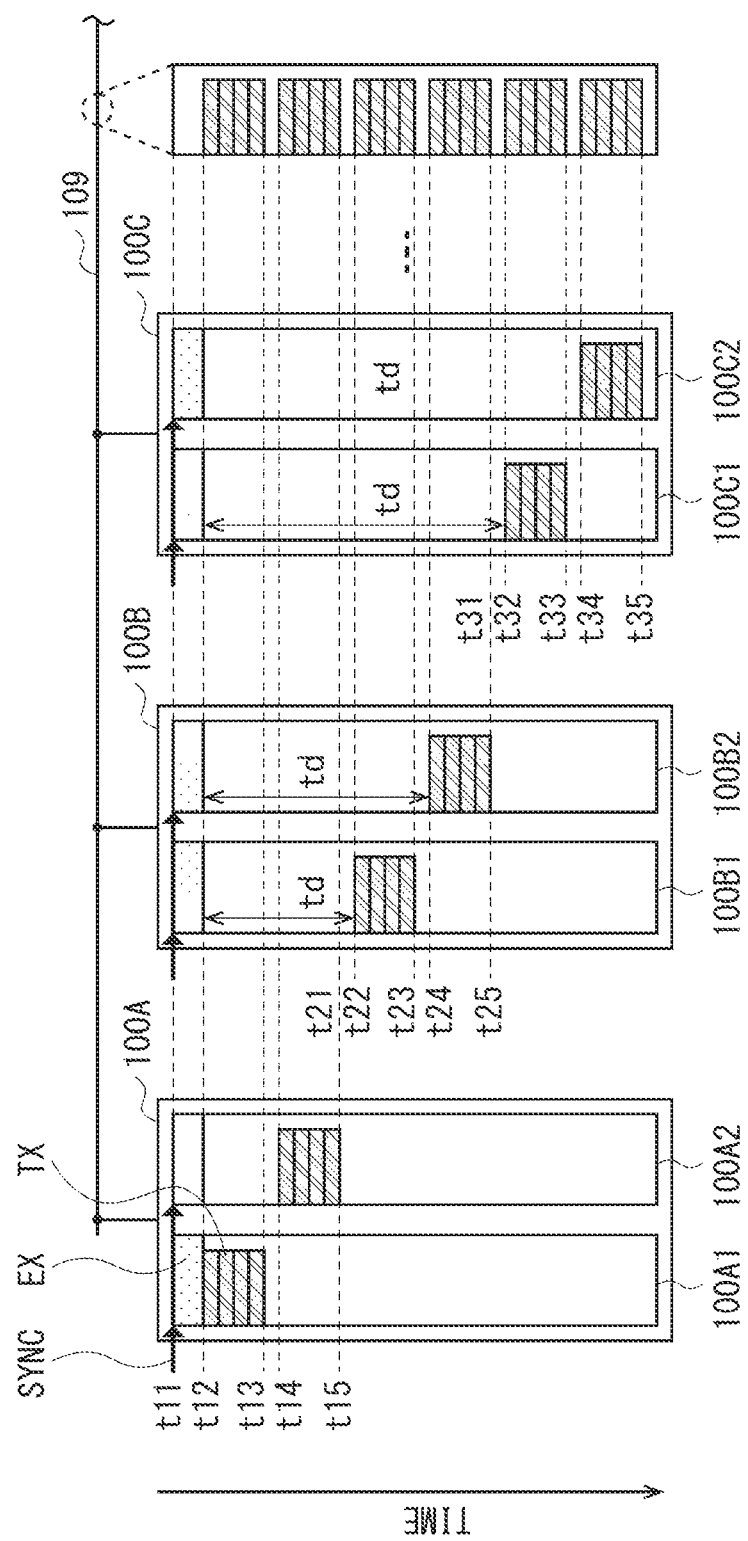
[FIG. 7]

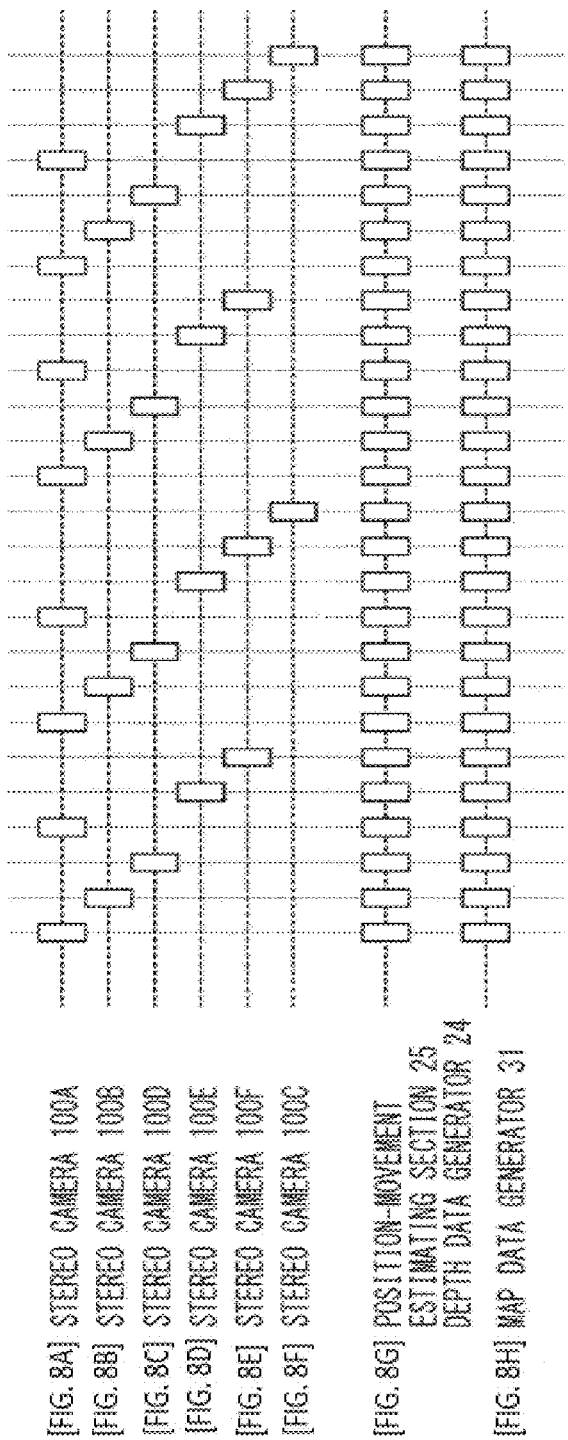

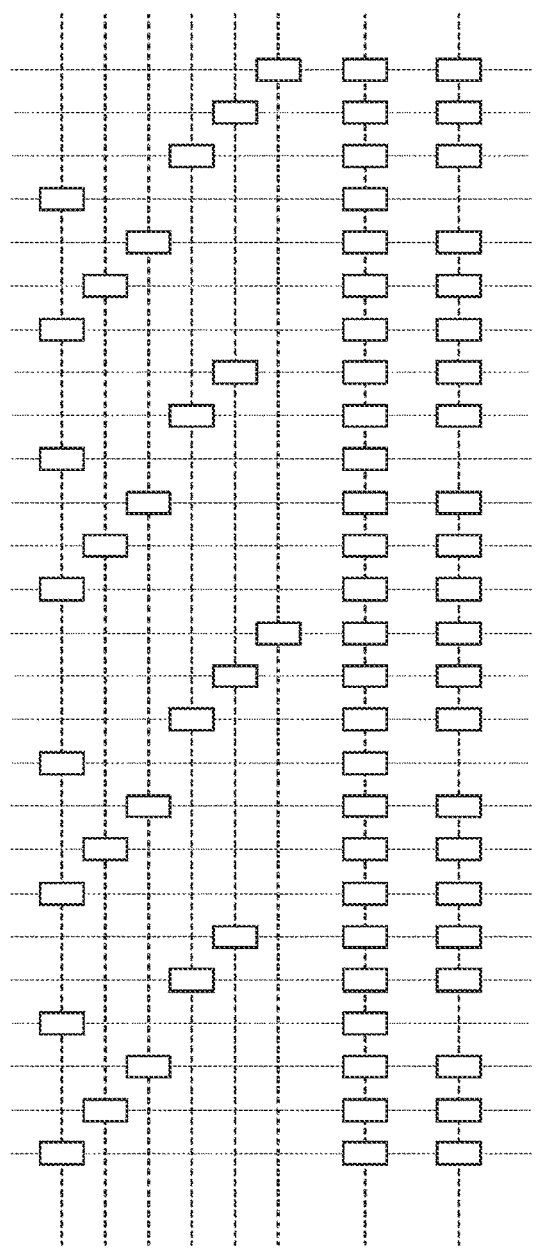

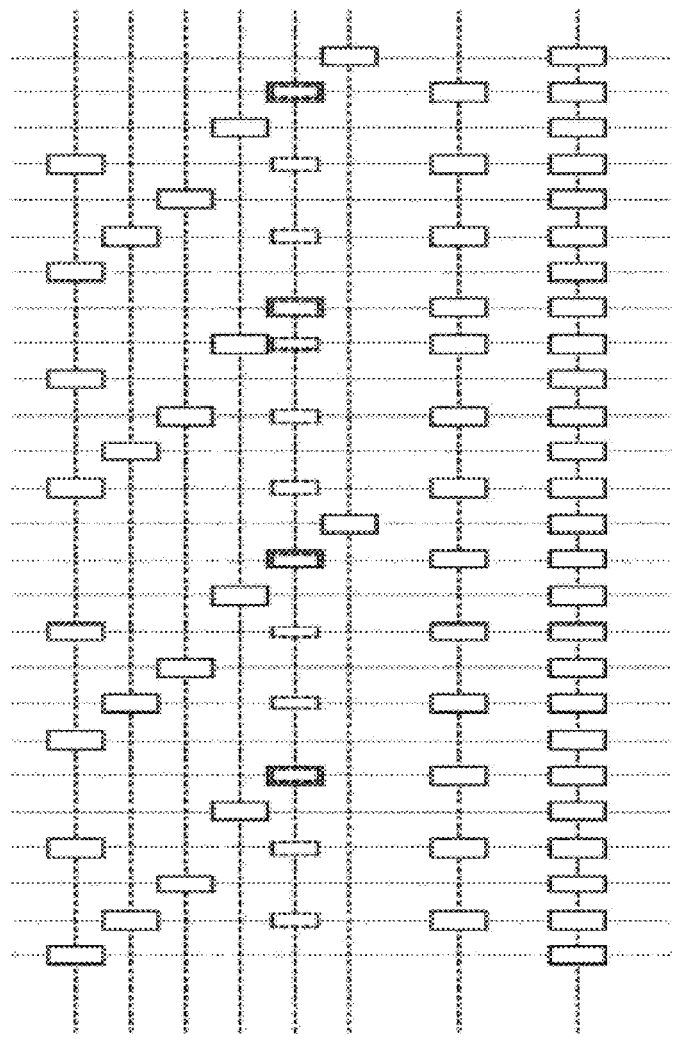

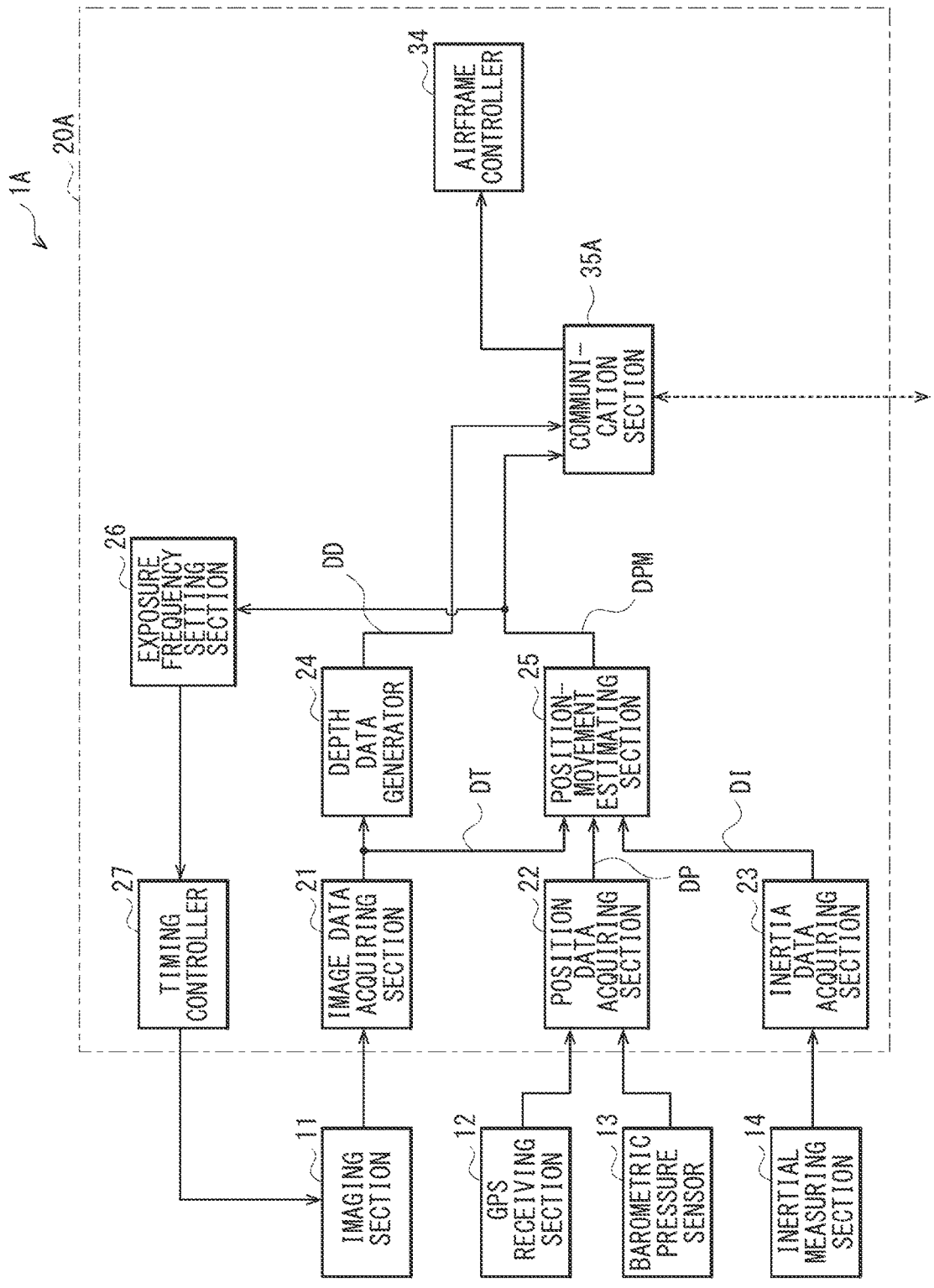
[FIG. 11]

[FIG. 12]
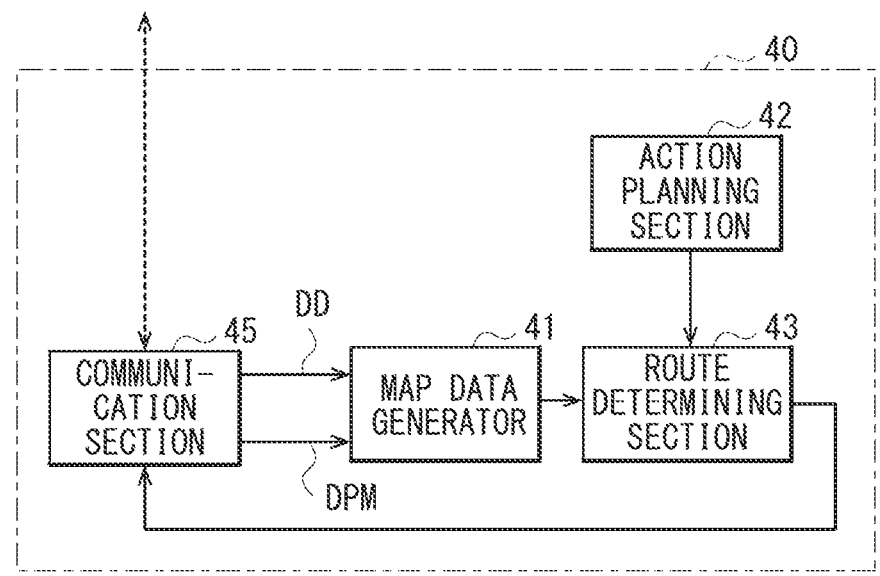

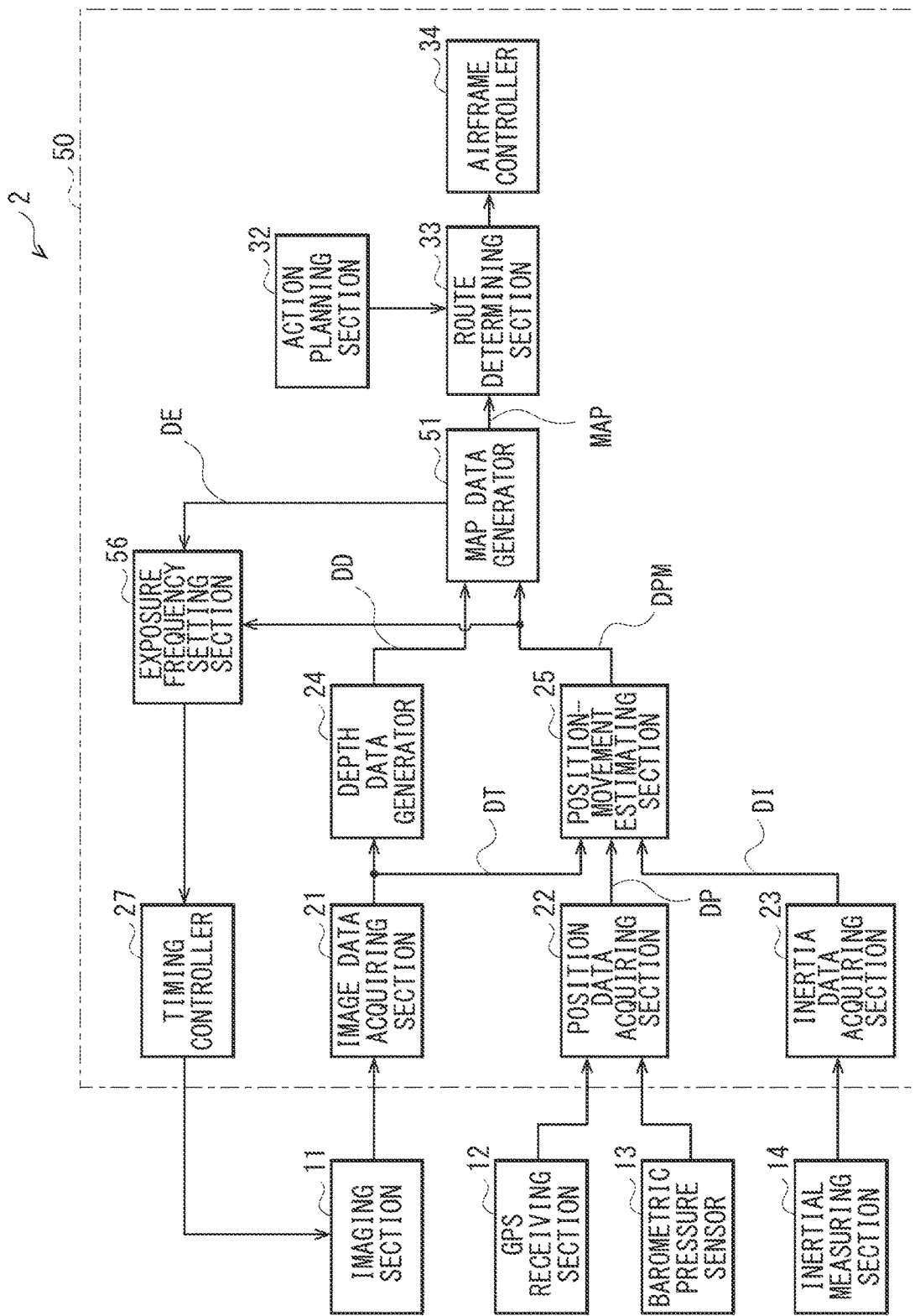

[FIG. 14]
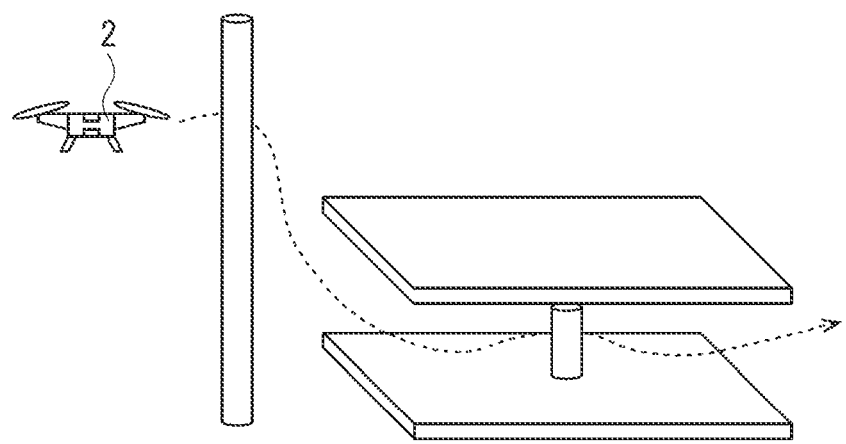

[FIG. 15]
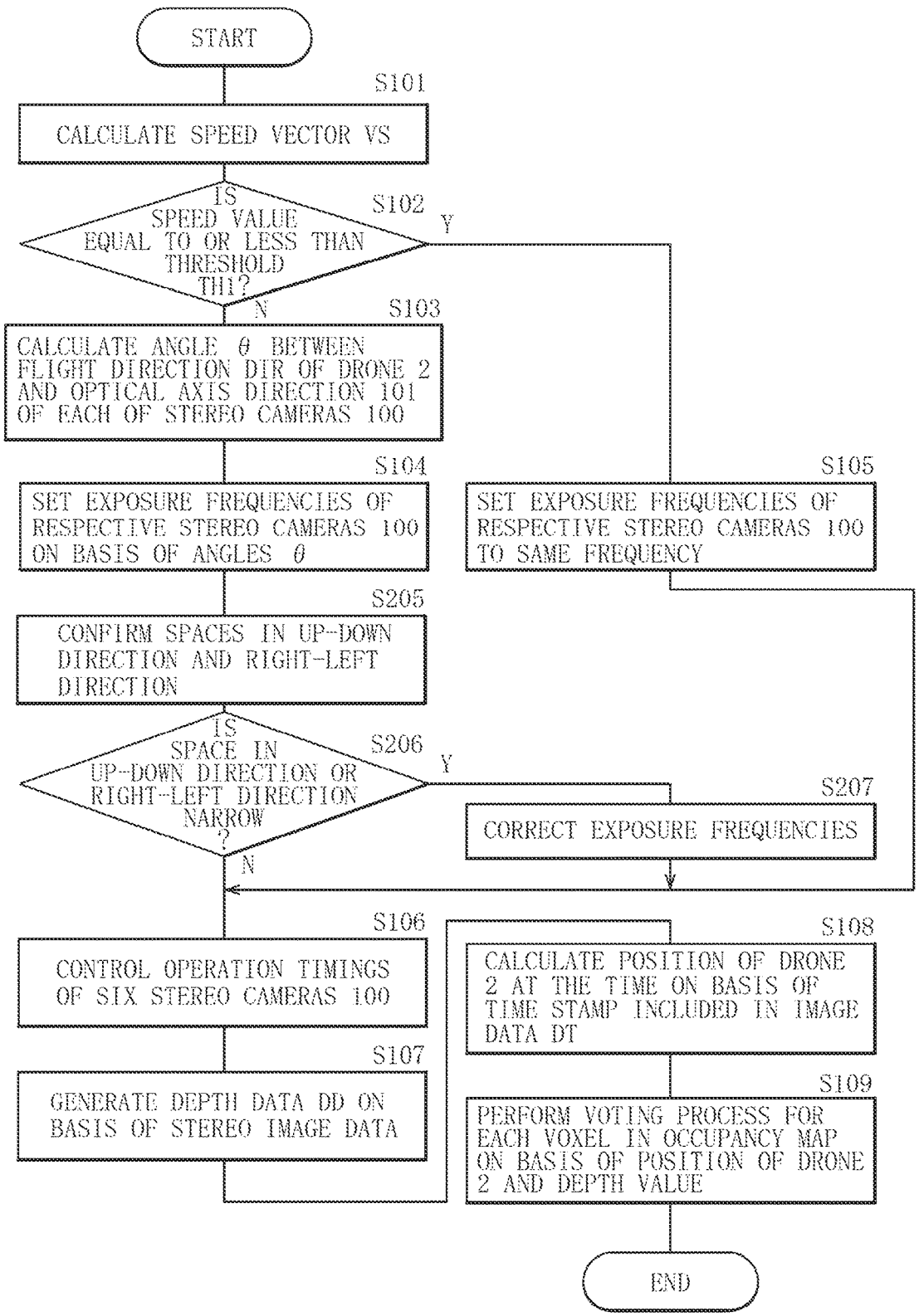

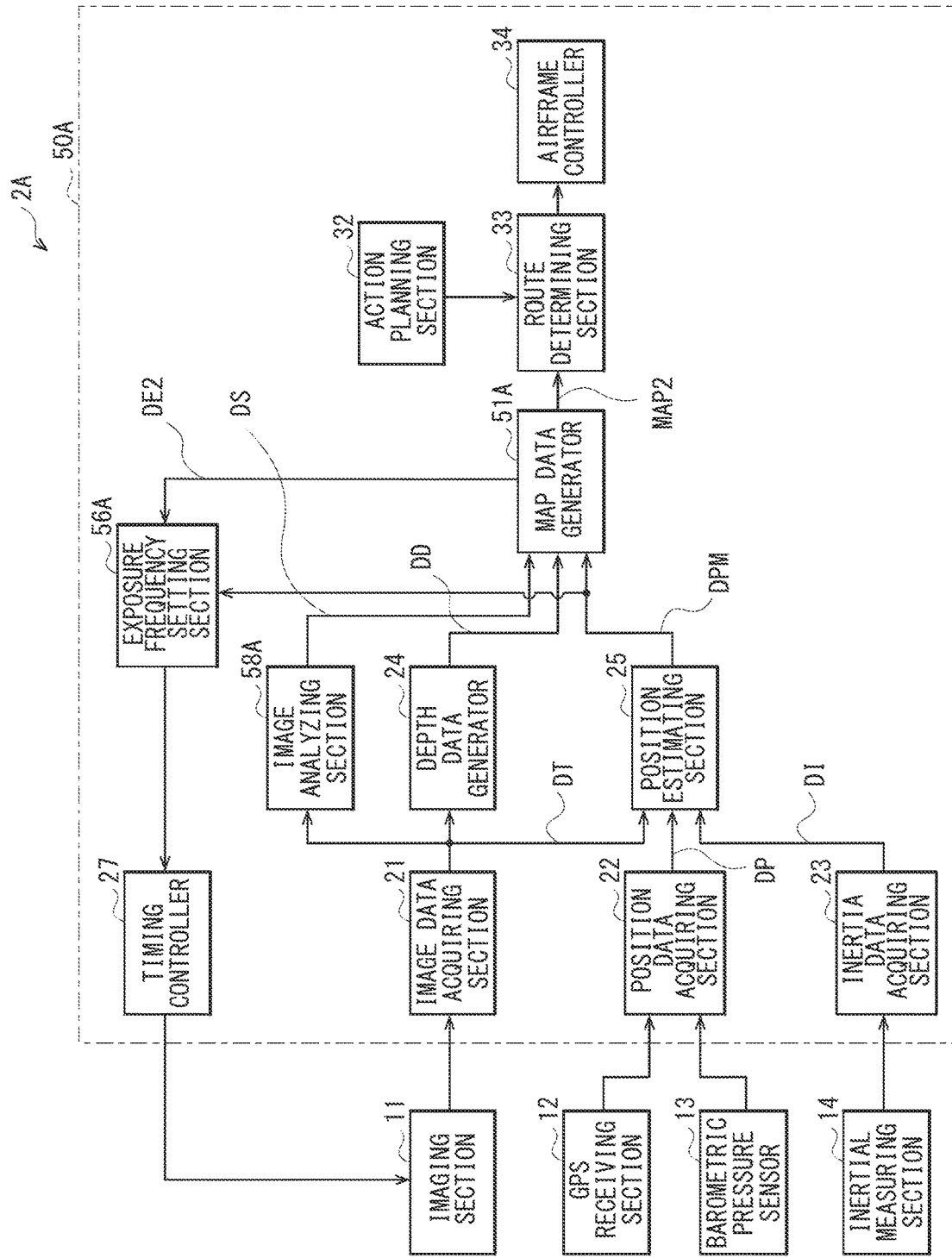
[FIG. 16]

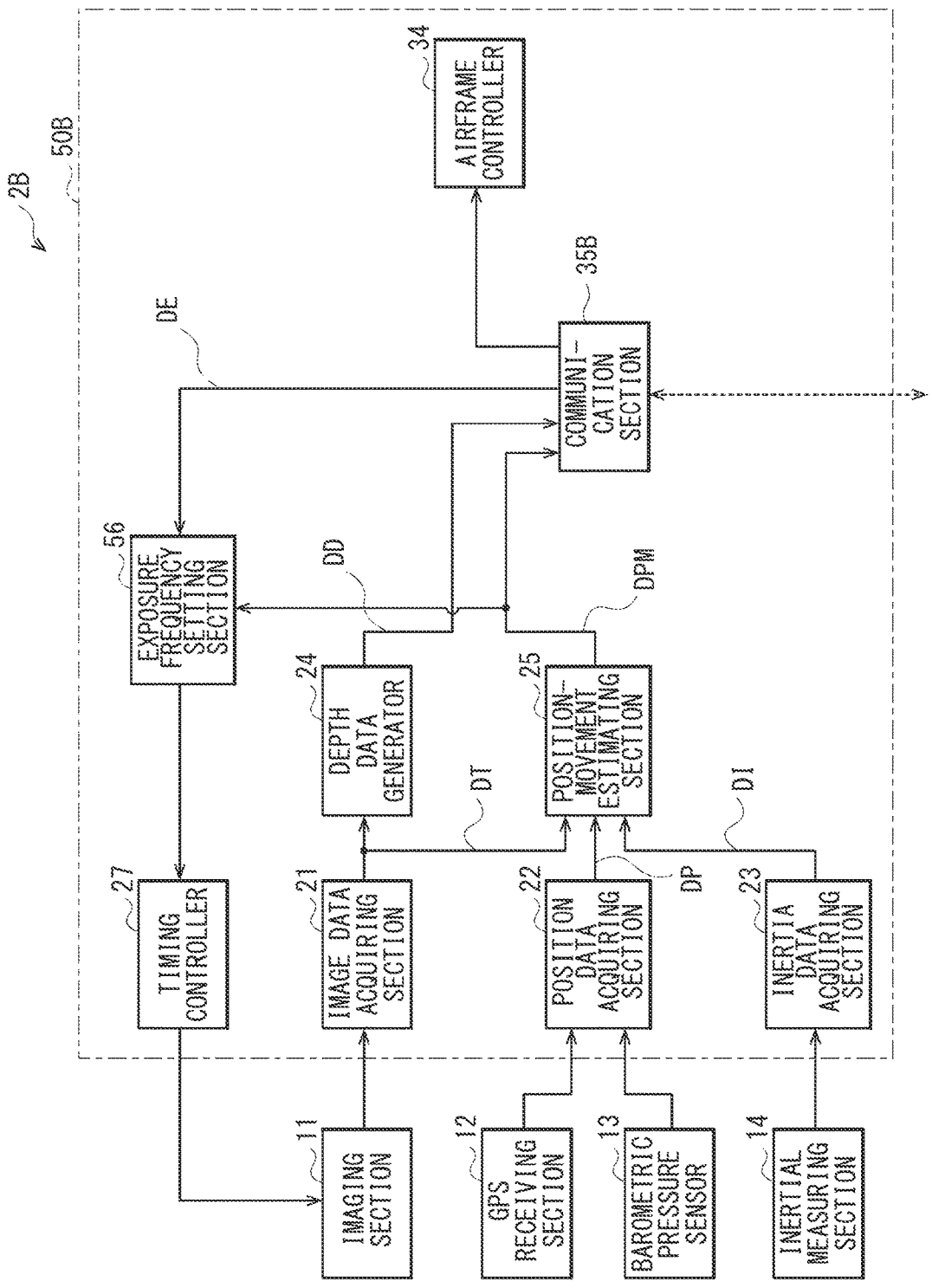
[FIG. 17]

[FIG. 18]
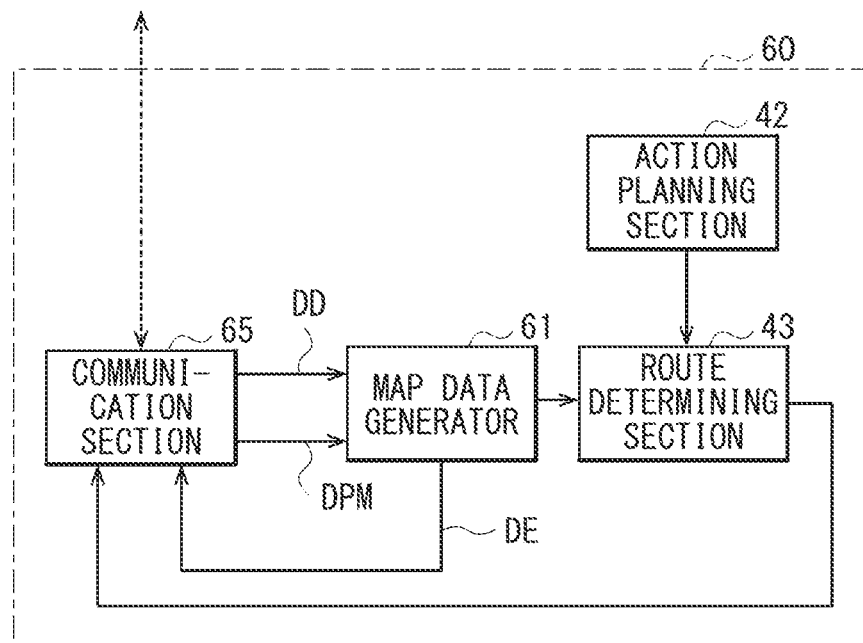

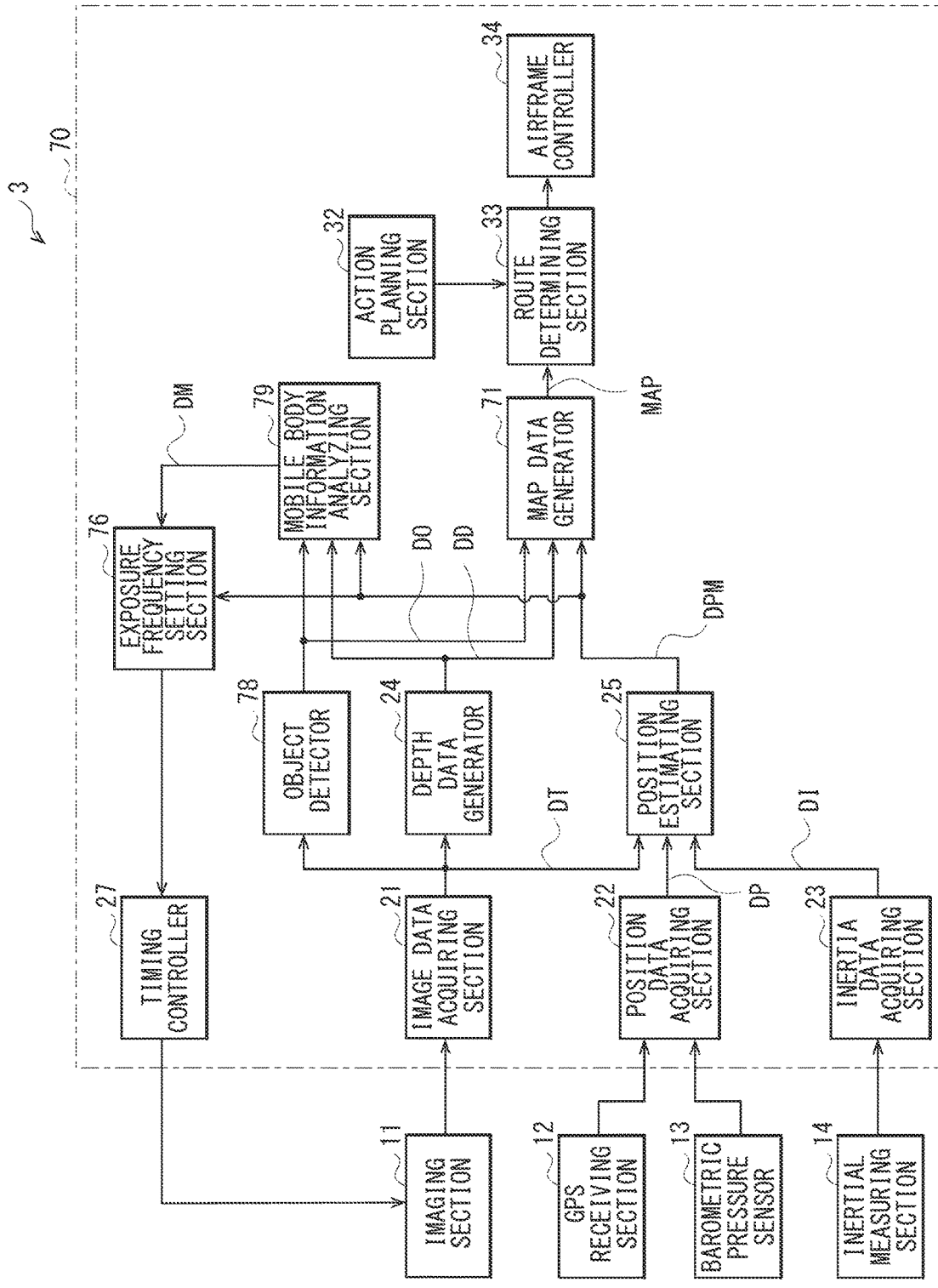
[FIG. 19]

[FIG. 20]
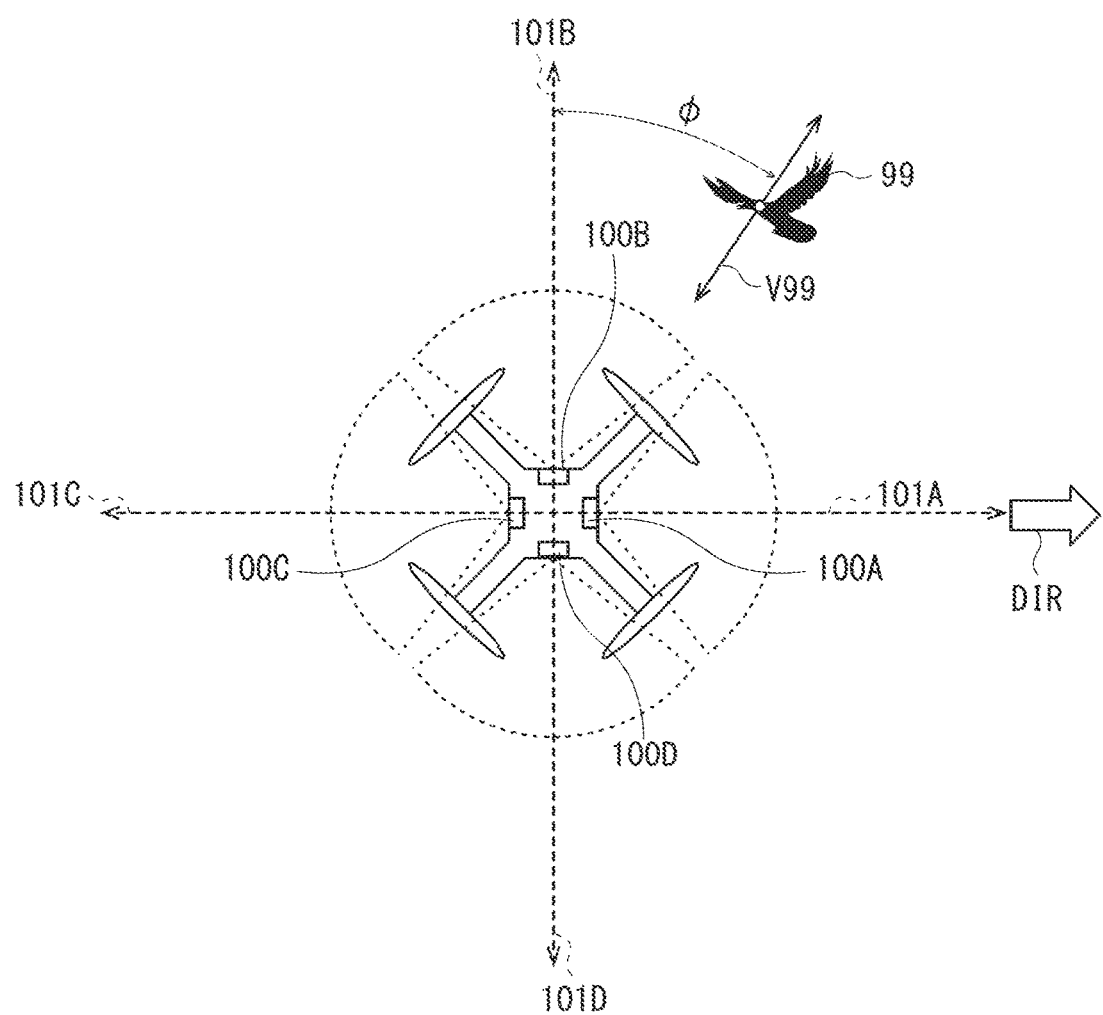

[FIG. 21]
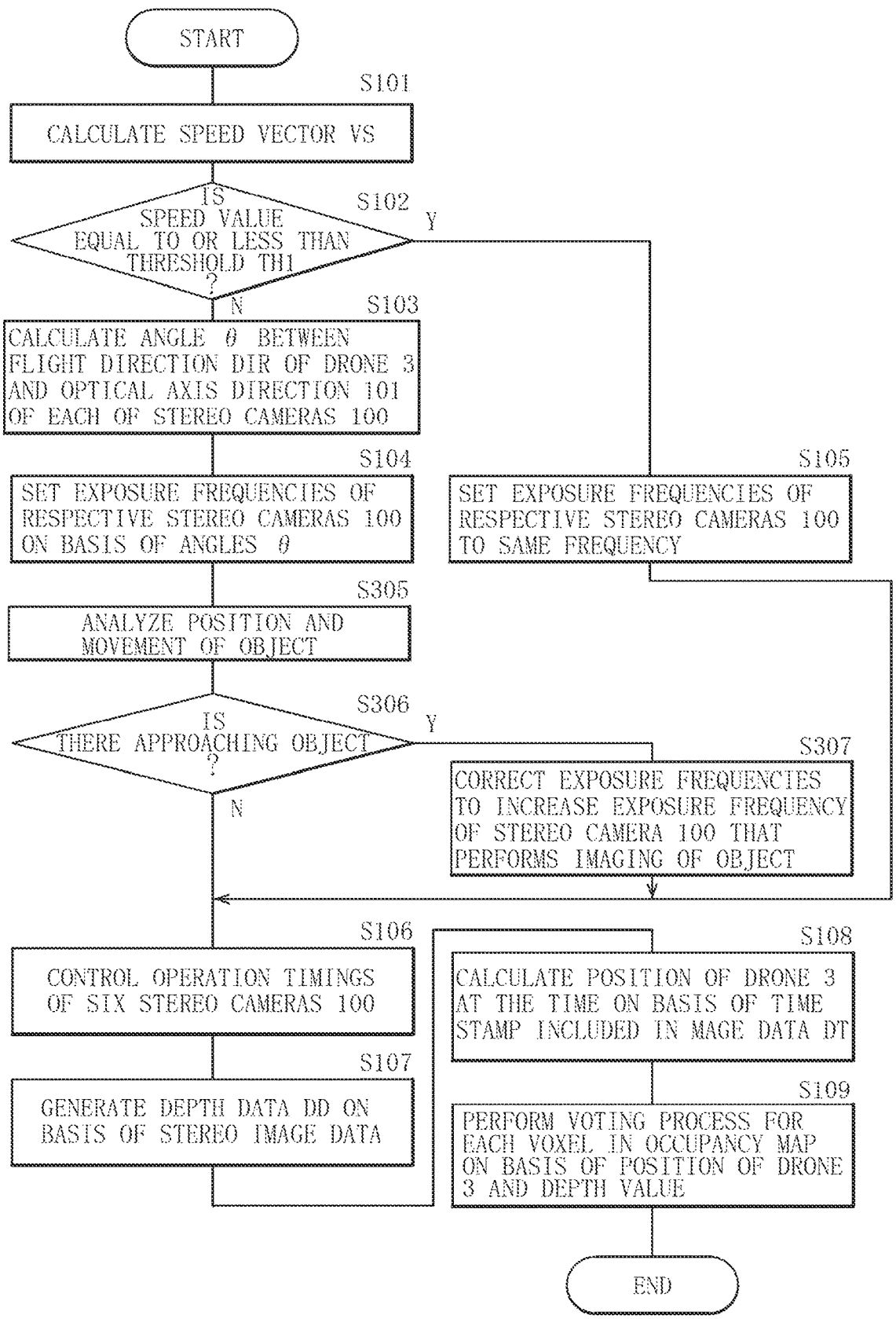

[FIG. 22]
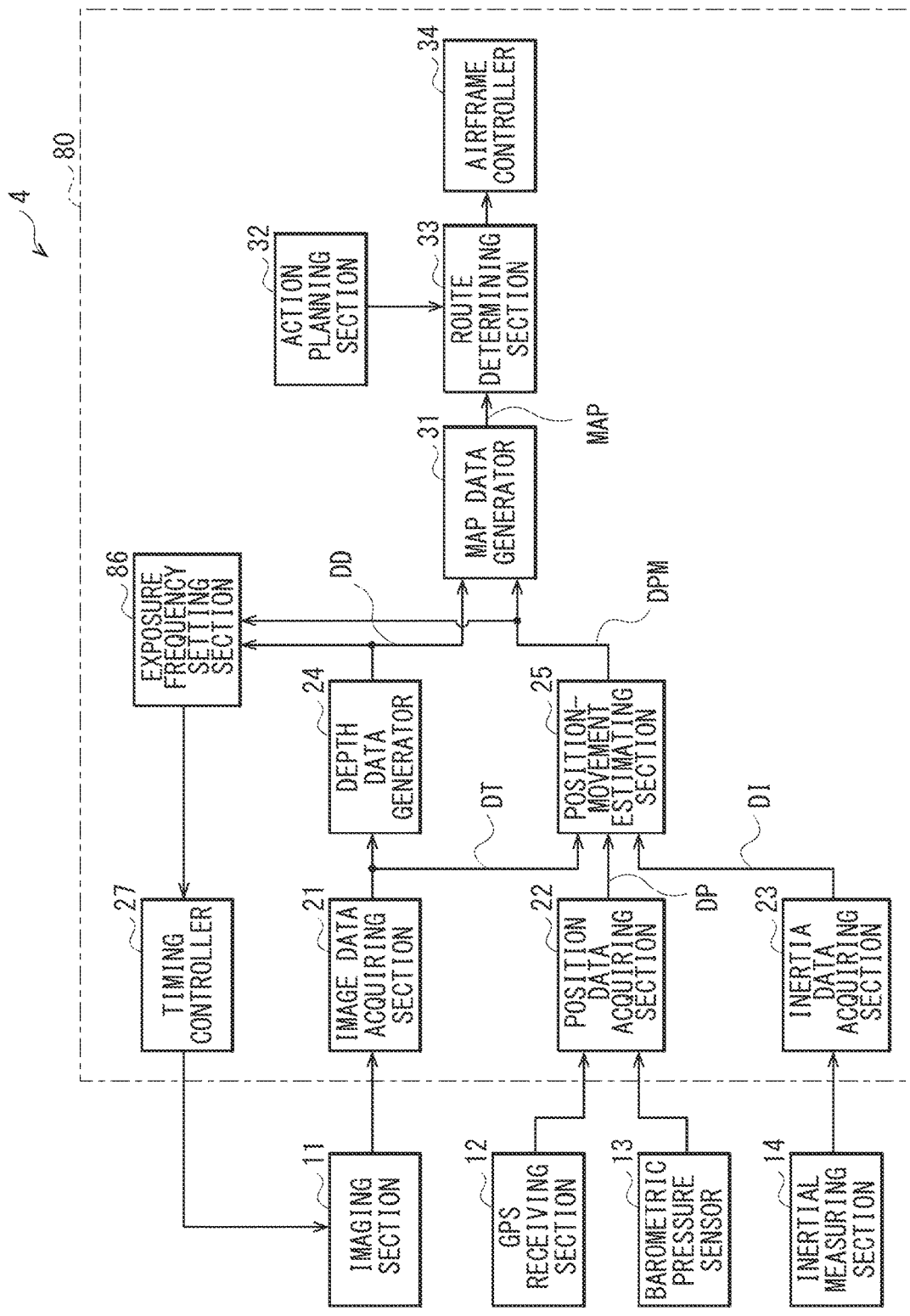

[FIG. 23]
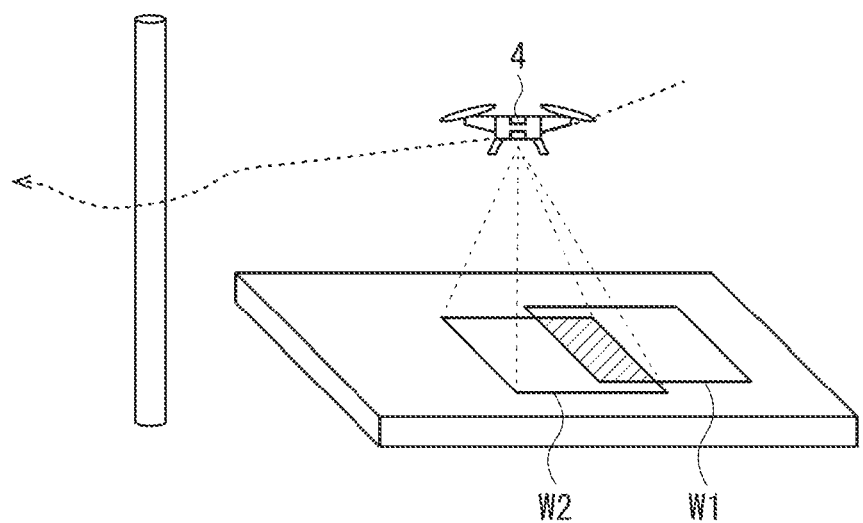

[FIG. 24]
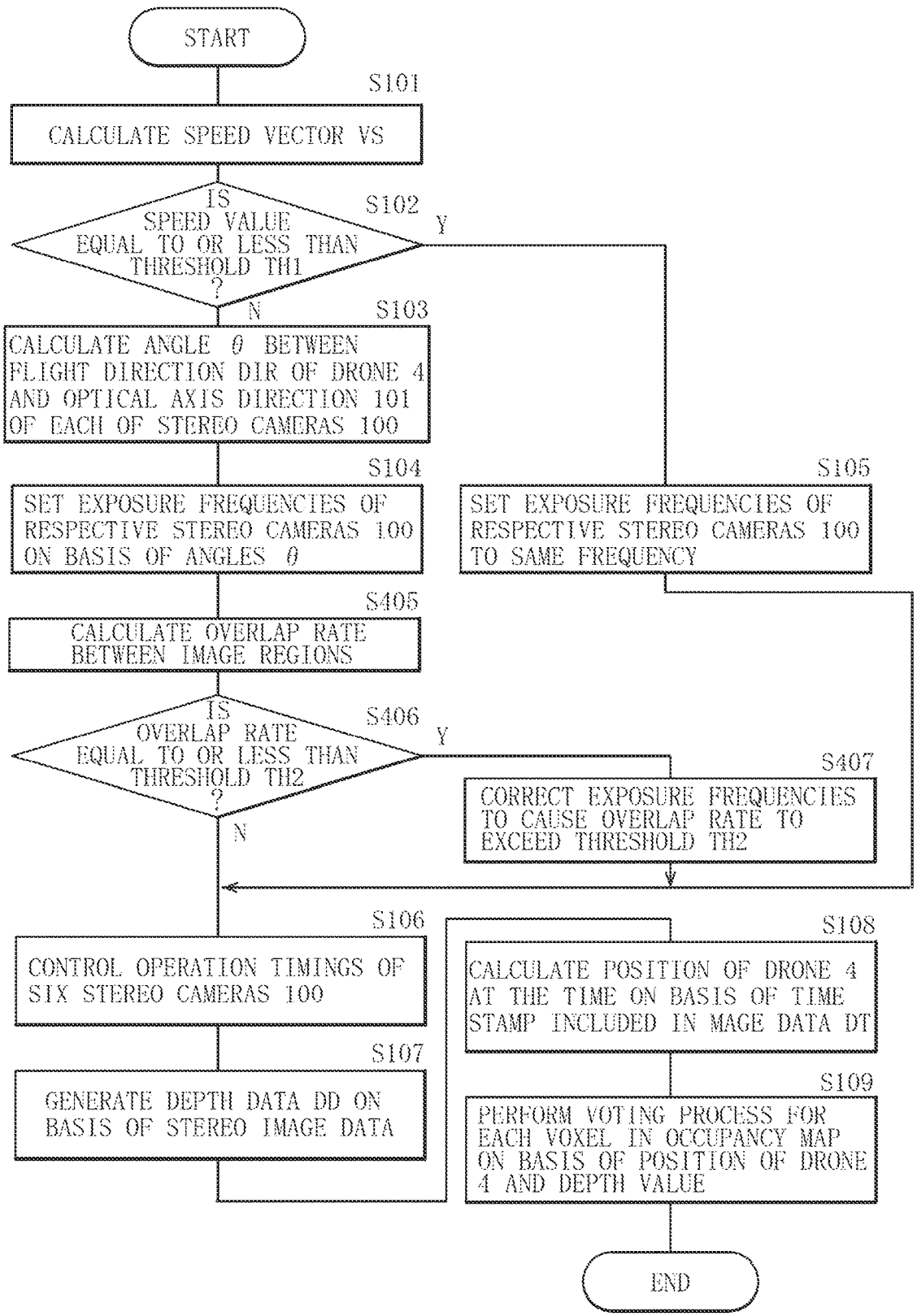

IMAGING CONTROL DEVICE AND IMAGING CONTROL METHOD

CROSS REFERENCE TO RELATED APPLICATIONS

This application is a U.S. National Phase of International Patent Application No. PCT/JP2021/000532 filed on Jan. 8, 2021, which claims priority benefit of Japanese Patent Application No. JP 2020-011031 filed in the Japan Patent Office on Jan. 27, 2020. Each of the above-referenced applications is hereby incorporated herein by reference in its entirety.

TECHNICAL FIELD

The present disclosure relates to an imaging control device that controls an operation of an imaging device, and an imaging control method used in such an imaging control device.

BACKGROUND ART

A robot device often includes an imaging device, and map data indicating an environment around the robot device is generated on the basis of an image acquired by the imaging device. For example, PTL 1 discloses a robot device that generates an environment map and determines an action with use of the generated environment map.

CITATION LIST

Patent Literature

PTL 1: Japanese Unexamined Patent Application Publication No. 2003-266349

SUMMARY OF THE INVENTION

Incidentally, it is desired to be able to effectively use computational resources upon performing arithmetic processing on the basis of an image acquired by an imaging device.

It is desirable to provide an imaging control device and an imaging control method that are able to effectively use computational resources.

An imaging control device according to an embodiment of the present disclosure includes a setting section and an exposure controller. The setting section is configured to calculate a camera angle between a moving direction of an device including a plurality of stereo cameras and an optical axis direction of each of the plurality of stereo cameras, and set an exposure frequency of each of the plurality of stereo cameras on the basis of a plurality of the camera angles. The exposure controller is configured to control operations of the plurality of stereo cameras on the basis of a plurality of the exposure frequencies set by the setting section.

An imaging control method according to an embodiment of the present disclosure includes: calculating a camera angle between a moving direction of an device including a plurality of stereo cameras and an optical axis direction of each of the plurality of stereo cameras, and setting an exposure frequency of each of the plurality of stereo cameras on the basis of a plurality of the camera angles, and controlling operations of the plurality of stereo cameras on the basis of a plurality of the set exposure frequencies.

In the imaging control device and the imaging control method according to the embodiments of the present disclosure, the camera angle between the moving direction of the imaging control device and the optical axis direction of each of the plurality of stereo cameras is calculated, and the exposure frequency of each of the plurality of stereo cameras is set on the basis of the plurality of camera angles. Then, the operations of the plurality of stereo cameras are controlled on the basis of the plurality of set exposure frequencies.

BRIEF DESCRIPTION OF THE DRAWINGS

FIG. 1 is a block diagram illustrating a configuration example of a drone according to a first embodiment of the present disclosure.

FIGS. 2A and 2B are explanatory diagrams illustrating a configuration example of a drone according to an embodiment.

FIG. 3 is a block diagram illustrating a configuration example of an imaging section illustrated in FIG. 1.

FIG. 4 is a flowchart illustrating an operation example of the drone illustrated in FIG. 1.

FIG. 5 is an explanatory diagram illustrating an operation example of the drone illustrated in FIG. 1.

FIG. 6 is a timing chart illustrating an operation example of the imaging section illustrated in FIG. 1.

FIG. 7 is a timing chart illustrating an operation example of an imaging section according to a comparative example.

FIGS. 8A, 8B, 8C, 8D, 8E, 8F, 8G, and 8H are timing charts illustrating an operation example of the drone illustrated in FIG. 1.

FIGS. 9A, 9B, 90, 9D, 9E, 9F, 9G, and 9H are timing charts illustrating an operation example of a drone according to a modification example of the first embodiment.

FIGS. 10A, 10B, 10C, 10D, 10E, 10F, 10G, and 10H are timing charts illustrating an operation example of a drone according to another modification example of the first embodiment.

FIG. 11 is a block diagram illustrating a configuration example of a drone according to another modification example of the first embodiment.

FIG. 12 is a block diagram illustrating a configuration example of a server according to another modification example of the first embodiment.

FIG. 13 is a block diagram illustrating a configuration example of a drone according to a second embodiment.

FIG. 14 is an explanatory diagram illustrating an operation example of the drone illustrated in FIG. 13.

FIG. 15 is a flowchart illustrating an operation example of the drone illustrated in FIG. 13.

FIG. 16 is a block diagram illustrating a configuration example of a drone according to a modification example of the second embodiment.

FIG. 17 is a block diagram illustrating a configuration example of a drone according to another modification example of the second embodiment.

FIG. 18 is a block diagram illustrating a configuration example of a server according to another modification example of the second embodiment.

FIG. 19 is a block diagram illustrating a configuration example of a drone according to a third embodiment.

FIG. 20 is an explanatory diagram illustrating an operation example of the drone illustrated in FIG. 19.

FIG. 21 is a flowchart illustrating an operation example of the drone illustrated in FIG. 19.

FIG. 22 is a block diagram illustrating a configuration example of the drone according to the third embodiment.

FIG. 23 is an explanatory diagram illustrating an operation example of the drone illustrated in FIG. 22.

FIG. 24 is a flowchart illustrating an operation example of the drone illustrated in FIG. 22.

MODES FOR CARRYING OUT THE INVENTION

Hereinafter, some embodiments of the present disclosure are described in detail with reference to the drawings. It is to be noted that description is given in the following order.
1. First Embodiment
2. Second Embodiment
3. Third Embodiment
4. Fourth Embodiment 1.First Embodiment Configuration Example FIG. 1 illustrates a configuration example of a drone 1 including an imaging control device according to an embodiment. FIGS. 2A and 2B illustrate an example of an appearance of the drone 1, where FIG. 2A illustrates a plan view and FIG. 2B illustrates a front view. It is to be noted that an imaging control method according to an embodiment of the present disclosure is embodied by the present embodiment, and is described together.

As illustrated in FIG. 1, the drone 1 includes an imaging section 11, a GPS (Global Positioning System) receiving section 12, a barometric pressure sensor 13, a inertial measuring section 14, and a controller 20. In addition, as illustrated in FIGS. 2A and 2B, the drone 1 includes a main body section 91, four arm sections 92, and four rotary wings 93. The imaging section 11, the GPS receiving section 12, the barometric pressure sensor 13, the inertial measuring section 14, and the controller 20 are contained in the main body section 91 of the drone 1.

The imaging section 11 (FIG. 1) is configured to generate image data by imaging of surroundings of the drone 1 on the basis of an instruction from the controller 20. As illustrated in FIGS. 2A and 2B, in this example, the imaging section 11 includes six stereo cameras 100 (stereo cameras 100A to 100F). Each of the six stereo cameras 100 includes two image sensors disposed apart from each other by a predetermined distance in this example, and is configured to generate image data (stereo image data) about two captured images having a parallax therebetween by performing an exposure operation. This stereo image data includes a time stamp that indicates an exposure timing. It is to be noted that in this example, each of the six stereo cameras 100 includes two image sensors; however, each of the six stereo cameras 100 is not limited thereto, and may include, for example, three or more image sensors.

As illustrated in FIGS. 2A and 2B, the six stereo cameras 100 are provided in the main body section 91 to cause optical axis directions 101 thereof to be directions different from each other. Specifically, an optical axis direction 101A of the stereo camera 100A is an X-axis direction; an optical axis direction 101B of the stereo camera 100B is a Y-axis direction; an optical axis direction 101C of the stereo camera 100C is a direction opposite to the X-axis direction; an optical axis direction 101D of the stereo camera 100D is a direction opposite to the Y-axis direction; an optical axis direction 101E of the stereo camera 100E is a Z-axis direction; and an optical axis direction 101F of the stereo camera 100F is a direction opposite to the Z-axis direction. With this configuration, the stereo cameras 100A to 100D each perform imaging in a horizontal direction of the drone 1; the stereo camera 100E performs imaging in an upward direction of the drone 1; and the stereo camera 100F performs imaging in a downward direction of the drone 1.

FIG. 3 illustrates a configuration example of the imaging section 11. The imaging section 11 includes six stereo cameras 100 and a bus wiring line 109. The six stereo cameras 100 are coupled to the bus wiring line 109. The bus wiring line 109 includes, for example, a plurality of wiring lines. As a communication interface for the six stereo cameras 100, for example, an MIPI (Mobile Industry Processor Interface) is applicable. The six stereo cameras 100 transmit generated image data to the controller 20 via the bus wiring line 109 in a time division manner.

The GPS receiving section 12 is configured to detect a position of the drone 1 by receiving signals transmitted from a plurality of artificial satellites. The barometric pressure sensor 13 is configured to detect a barometric pressure. Information about the detected barometric pressure is used to detect an altitude of the drone 1. Thus, the GPS receiving section 12 and the barometric pressure sensor 13 function as position sensors that detect the position of the drone 1.

The inertial measuring section 14 is configured with use of, for example, an IMU (inertial measurement unit), and is configured to detect an angular speed and an acceleration. The IMU includes, for example, an acceleration sensor, a gyroscope sensor, a magnetic sensor, and the like.

The controller 20 is configured to control flight of the drone 1 on the basis of data supplied from the imaging section 11, the GPS receiving section 12, the barometric pressure sensor 13, and the inertial measuring section 14. In addition, the controller 20 also performs processing for controlling an operation of the imaging section 11. The controller 20 includes an image data acquiring section 21, a position data acquiring section 22, an inertia data acquiring section 23, a depth data generator 24, a position-movement estimating section 25, an exposure frequency setting section 26, a timing controller 27, a map data generator 31, an action planning section 32, a route determining section 33, and an airframe controller 34. The controller 20 is configured with use of, for example, one or a plurality of processors.

The image data acquiring section 21 is configured to acquire image data supplied from the imaging section 11 and supply thus-acquired data as image data DT to the depth data generator 24 and the position-movement estimating section 25.

The position data acquiring section 22 is configured to acquire detection results of the GPS receiving section 12 and the barometric pressure sensor 13 and supply thus-acquired data as position data DP to the position-movement estimating section 25.

The inertia data acquiring section 23 is configured to acquire a detection result of the inertial measuring section 14 and supply thus-acquired data as inertia data DI to the position-movement estimating section 25.

The depth data generator 24 is configured to generate depth data DD including a depth map that indicates a depth value map in a captured image on the basis of stereo image data included in the image data DT.

The position-movement estimating section 25 estimates the position and movement of the drone 1 on the basis of the image data DT, the position data DP, and the inertia data DI. Specifically, the position-movement estimating section 25 performs VIO (Visual Inertial Odometry) processing on the basis of the image data DT, and calculates a position, an attitude, a speed vector VS, and an angular speed of the drone 1 at a time indicated by the time stamp included in the image data DT with use of the position data DP and the inertia data DI, and generates position-movement data DPM including these data.

The exposure frequency setting section 26 is configured to set exposure frequencies of the six stereo cameras 100 in the imaging section 11 on the basis of the speed vector VS included in the position-movement data DPM and set an exposure timing of each of the six stereo cameras 100 on the basis of the set exposure frequencies. Specifically, the exposure frequency setting section 26 sets the exposure frequencies of the six stereo cameras 100 on the basis of a speed value indicated by the speed vector VS, and an angle θ between a flight direction DIR of the drone 1 indicated by the speed vector VS and the optical axis direction 101 of each of the six stereo cameras 100. Then, the exposure frequency setting section 26 sets the exposure timings of the six stereo cameras 100 to cause the exposure timings in the six stereo cameras 100 to be different from each other.

The timing controller 27 is configured to control operation timings of the six stereo cameras 100 on the basis of an instruction from the exposure frequency setting section 26.

The map data generator 31 is configured to generate map data MAP including an occupancy map (Occupancy Map) on the basis of the depth data DD and the position-movement data DPM. Specifically, the map data generator 31 generates the map data MAP by performing a voting process for each voxel in the occupancy map on the basis of a depth value included in the depth data DD and the position of the drone 1 included in the position-movement data DPM.

The action planning section 32 is configured to plan an action of the drone 1 on the basis of a preset destination, and control instruction data transmitted from a control terminal.

The route determining section 33 is configured to determine a flight route of the drone 1 on the basis of the map data MAP and a determination result of the action planning section 32.

The airframe controller 34 is configured to control an airframe of the drone 1 on the basis of the flight route determined by the route determining section 33. As illustrated in FIGS. 2A and 2B, each of the four rotary wings 93 is attached to an end of a corresponding one of the four arm sections 92, and is configured to be rotatable. The four rotary wings 93 rotate on the basis of driving force generated by four motors (not illustrated). The airframe controller 34 controls operations of these four motors on the basis of the determined flight route. This makes it possible for the drone 1 to fly along the determined flight route.

Here, the exposure frequency setting section 26 corresponds to a specific example of a "setting section" in the present disclosure. The timing controller 27 corresponds to a specific example of an "exposure controller" in the present disclosure. The six stereo cameras 100 correspond to a specific example of a "plurality of stereo cameras" in the present disclosure. The angle θ corresponds to a specific example of a "camera angle" in the present disclosure. The bus wiring line 109 corresponds to a specific example of a "bus wiring line" in the present disclosure. The image data acquiring section 21 corresponds to a specific example of an "image acquiring section" in the present disclosure.

[Operation and Workings]

Next, description is given of an operation and workings of the drone 1 according to the present embodiment.

(Overview of Entire Operation)

First, description is given of an overview of an entire operation of the drone 1 with reference to FIG. 1. The imaging section 11 generates image data by imaging of surroundings of the drone 1 on the basis of an instruction from the controller 20. The GPS receiving section 12 receives signals transmitted from a plurality of artificial satellites to detect the position of the drone 1. The barometric pressure sensor 13 detects a barometric pressure. The inertial measuring section 14 detects an angular speed and an acceleration. The controller 20 controls flight of the drone 1 on the basis of data supplied from the imaging section 11, the GPS receiving section 12, the barometric pressure sensor 13, and the inertial measuring section 14, and controls an operation of the imaging section 11.

(Detailed Operation)

FIG. 4 illustrates an operation example of the controller 20. In the controller 20, the depth data generator 24 generates the depth data DD on the basis of stereo image data included in the image data DT, and the position-movement estimating section 25 estimates the position and movement of the drone 1 on the basis of the image data DT, the position data DP, and the inertia data DI to generate the position-movement data DPM. The exposure frequency setting section 26 sets the exposure frequencies of the six stereo cameras 100 in the imaging section 11 on the basis of the speed vector VS included in the position-movement data DPM, and sets the respective exposure timing of the six stereo cameras 100 on the basis of the set exposure frequencies. The map data generator 31 generates the map data MAP including the occupancy map on the basis of the depth data DD and the position-movement data DPM. This operation is described in detail below.

The position-movement estimating section 25 calculates the speed vector VS of the drone 1 on the basis of the image data DT, the position data DP, and the inertia data DI (step S101). Specifically, the position-movement estimating section 25 performs VIO processing on the basis of the image data DT, and calculates the speed vector VS of the drone 1 with use of the position data DP and the inertia data DI.

Next, the exposure frequency setting section 26 confirms whether or not a speed value indicated by the speed vector VS is equal to or less than a threshold TH1 (step S102).

In the step S102, in a case where the speed value is not equal to or less than the threshold TH1 ("N" in the step S102), the exposure frequency setting section 26 calculates the angle θ between the flight direction DIR of the drone 1 indicated by the speed vector VS and the optical axis direction 101 of each of the six stereo cameras 100 (step S103).

FIG. 5 illustrates an example of the angle θ. In this example, the flight direction DIR is the horizontal direction, and is a direction close to the optical axis direction 101A of the stereo camera 100A between the optical axis direction 101A and the optical axis direction 101B of the stereo camera 100B. The exposure frequency setting section 26 calculates an angle θA between the flight direction DIR and the optical axis direction 101A of the stereo camera 100A; calculates an angle θB between the flight direction DIR and the optical axis direction 101B of the stereo camera 100B; calculates an angle θC between the flight direction DIR and the optical axis direction 101C of the stereo camera 100C; and calculates an angle θD between the flight direction DIR and the optical axis direction 101D of the stereo camera 100D. In addition, although not illustrated, the exposure frequency setting section 26 calculates an angle θE between the flight direction DIR and the optical axis direction 101E of the stereo camera 100E, and calculates an angle θF between the flight direction DIR and the optical axis direction 101F of the stereo camera 100F. The angle θ is an angle smaller than 180 degrees.

In this example, the flight direction DIR is a direction close to the optical axis direction 101A of the stereo camera 100A; therefore, the angle θA is the smallest, and the angle θC is the largest. The flight direction DIR is the horizontal direction; therefore, the angles θE and θF each are 90 degrees.

Next, the exposure frequency setting section 26 sets the respective exposure frequencies of the six stereo cameras 100 on the basis of six angles θ (step S104). Specifically, the exposure frequency setting section 26 sets the exposure frequencies to cause the exposure frequency of the stereo camara 100 corresponding to the smallest angle θ among the six angles θ to be higher than the exposure frequency of one of the other stereo cameras 100. That is, in order to grasp an environment in the flight direction DIR more accurately, the exposure frequency setting section 26 sets the exposure frequencies to increase the exposure frequency of the stereo camera 100 that performs imaging in the flight direction DIR.

For example, the exposure frequency setting section 26 is able to calculate respective cosine values (cosine values) of the six angles θ and set the respective exposure frequencies of the six stereo cameras 100 on the basis of the cosine values. For example, in a case where the flight direction DIR is the same as the optical axis direction 101A of the stereo camera 100A, the angles θA to θF are as follows.
  Stereo camera 100A: θA=0 degrees
  Stereo camera 100B: θB=90 degrees
  Stereo camera 100C: θC=180 degrees
  Stereo camera 100D: θD=90 degrees
  Stereo camera 100E: θE=90 degrees
  Stereo camera 100F: θF=90 degrees
Accordingly, the cosine values are as follows.
  Stereo camera 100A: cos θA=1
  Stereo camera 100B: cos θB=0
  Stereo camera 100C: cos θC=−1
  Stereo camera 100D: cos θD=0
  Stereo camera 100E: cos θE=0
  Stereo camera 100F: cos θF=0
In this example, cos ° C. is the smallest; therefore, these cosine values each are divided by an absolute value of cos θC, and two is added to each of results of such division. Thus, the following numeric values are obtained.
  Stereo camera 100A: 3
  Stereo camera 100B: 2
  Stereo camera 100C: 1
  Stereo camera 100D: 2
  Stereo camera 100E: 2
  Stereo camera 100F: 2
In this example, these numeric values each are squared, which makes it possible to set the respective exposure frequencies of the six stereo cameras 100 as follows.
  Stereo camera 100A: 9
  Stereo camera 100B: 4
  Stereo camera 100C: 1
  Stereo camera 100D: 4
  Stereo camera 100E: 4
  Stereo camera 100F: 4
That is, in this example, it is possible to set a ratio of the exposure frequency of the stereo camera 100A, each of the exposure frequencies of the stereo cameras 100B, 100D, 100E, and 100F, and the exposure frequency of the stereo camera 100C to 9:4:1. It is to be noted that in this example, the numeric values are squared; however, in a case where it is desired to reduce a difference between the exposure frequencies, the numeric values may not be squared. In this case, the ratio of the exposure frequencies is 3:2:1. In addition, in a case where it is desired to increase the difference between the exposure frequencies, the numeric values may be cubed. In this case, the ratio of the exposure frequencies is 27:8:1.

It is to be noted that the above-described method of setting the respective exposure frequencies of the six stereo cameras 100 on the basis of the six angles θ is one example, but this is not limitative, and any of various methods may be used.

In the step S102, in a case where the speed value is equal to or less than the threshold TH1 ("Y" in the step S102), the exposure frequency setting section 26 sets the respective exposure frequencies of the six stereo cameras 100 to the same frequency (step S105). That is, in order to grasp an entire environment around the drone 1, the exposure frequency setting section 26 sets the exposure frequencies of all the stereo cameras 100 to the same frequency.

Thus, the exposure frequency setting section 26 sets the respective exposure frequencies of the six stereo cameras 100. The exposure frequency setting section 26 then sets respective exposure timings of the six stereo cameras 100 on the basis of the set exposure frequencies. At this time, the exposure frequency setting section 26 sets the respective exposure timings of the six stereo cameras 100 to cause the exposure timings in the six stereo cameras 100 to be different from each other.

Next, the timing controller 27 controls operation timings of the six stereo cameras 100 on the basis of an instruction from the exposure frequency setting section 26 (step S106).

In addition, the depth data generator 24 generates the depth data DD on the basis of the stereo image data included in the image data DT (step S107).

Next, the position-movement estimating section 25 calculates the position of the drone 1 at a time indicated by the time stamp included in the image data DT on the basis of the time stamp (step S108).

Then, the map data generator 31 performs the voting process for each voxel in the occupancy map on the basis of the position of the drone 1 acquired in the step S108 and the depth value acquired from the stereo image data including the time stamp (step S109). The map data MAP is updated in such a manner.

Thus, this flow ends. The controller 20 repeats such processing in each frame period.

As described above, in the drone 1, the exposure frequencies of the six stereo cameras 100 are set on the basis of the six angles θ. This makes it possible for the drone 1 to effectively use computational resources in the controller 20. That is, in order to grasp an environment around the drone 1 more accurately, it is desirable that the exposure frequencies be high. However, in this case, a computational burden of the controller 20 is increased. In the drone 1, the respective exposure frequencies of the six stereo cameras 100 are set on the basis of the six angles θ. Accordingly, for example, it is possible to increase the exposure frequency of the stereo camera 100 that performs imaging in the flight direction DIR and decrease the exposure frequency of the stereo camera 100 that performs imaging in a direction opposite to the flight direction DIR. As a result, in the drone 1, it is possible to allocate many of the computational resources of the controller 20 to arithmetic processing on image data acquired by performing imaging in the flight direction DIR, which makes it possible to grasp an environment in the flight direction DIR more accurately while effectively using limited computational resources.

In addition, in a case where a flight speed of the drone 1 is higher than a predetermined speed, the respective exposure frequencies of the six stereo cameras 100 are set on the basis of six angles θ. This makes it possible for the drone 1 to effectively use the computational resources in the controller 20. That is, in a case where the flight speed is slow, a moving amount of the drone 1 is small; therefore, it is possible to grasp the environment around the drone 1 with some degrees of accuracy even in a case where the exposure frequencies are low. In contrast, in a case where the flight speed is fast, the moving amount of the drone 1 is large; therefore, in order to grasp the environment around the drone 1, it is desirable that the exposure frequencies be high. However, in this case, the computational burden of the controller 20 becomes large. In the drone 1, in a case where the flight speed is fast, the respective exposure frequencies of the six stereo cameras 100 are set on the basis of the six angles θ. Accordingly, in the drone 1, in a case where the flight speed is fast, it is possible to allocate many of the computational resources of the controller 20 to arithmetic processing on the image data acquired by performing imaging in the flight direction DIR, which makes it possible to effectively use limited computational resources.

(About Exposure Timing)

The exposure frequency setting section 26 sets the respective exposure timings of the six stereo cameras 100 to cause the exposure timings in the six stereo cameras 100 to be different from each other. The six stereo cameras 100 generate image data by performing an exposure operation on the basis of an instruction from the controller 20. The six stereo cameras 100 then transmit the thus-generated image data to the controller 20 via the bus wiring line 109 in a time division manner. This operation is described in detail below.

FIG. 6 illustrates an operation example of the imaging section 11. In this example, the exposure timings are set in order of the stereo camera 100A, the stereo camera 100B, the stereo camera 100C, . . . .

First, two image sensors 100A1 and 100A2 of the stereo camera 100A perform an exposure operation EX in a period from a timing t11 to a timing t12 on the basis of a synchronization signal SYNC1. The stereo camera 100A then performs a transmission operation TX in a period from the timing t12 to a timing t13 to transmit image data generated by the image sensor 100A1 to the controller 20 via the bus wiring line 109, and performs the transmission operation TX in a period from the timing t13 to a timing t14 to transmit image data generated by the image sensor 100A2 to the controller 20 via the bus wiring line 109.

Likewise, two image sensors 100B1 and 100B2 of the stereo camera 100B perform the exposure operation EX in a period from a timing t21 to a timing t22 on the basis of a synchronization signal SYNC2. The stereo camera 100B then performs the transmission operation TX in a period from the timing t22 to a timing t23 to transmit image data generated by the image sensor 100B1 to the controller 20 via the bus wiring line 109, and performs the transmission operation TX in a period from the timing t23 to a timing t24 to transmit image data generated by the image sensor 100B2 to the controller 20 via the bus wiring line 109.

Likewise, two image sensors 100C1 and 100C2 of the stereo camera 100C perform the exposure operation EX in a period from a timing t31 to a timing t32 on the basis of a synchronization signal SYNC3. The stereo camera 100C then performs the transmission operation TX in a period from the timing t32 to a timing t33 to transmit image data generated by the image sensor 100C1 to the controller 20 via the bus wiring line 109, and performs the transmission operation TX in a period from the timing t33 to a timing t34 to transmit image data generated by the image sensor 100C2 to the controller 20 via the bus wiring line 109.

Thus, in the six stereo cameras 100, the exposure timings are set to be different from each other. Then, the six stereo cameras 100 transmit generated image data to the controller 20 via the bus wiring line 109 in a time division manner.

Thus, in the drone 1, the exposure timings of the six stereo cameras 100 are different from each other, which makes it possible to reduce delay. That is, for example, in a case where the exposure timings of the six stereo cameras 100 are the same, as illustrated in FIG. 7, for example, in the stereo cameras 100B and 100C, a time td from the exposure operation EX to the transmission operation TX is generated, and the controller 20 may not be able to acquire image data timely. In contrast, in the drone 1, the exposure timings of the six stereo cameras 100 are different from each other; therefore, for example, as illustrated in FIG. 6, it is possible to perform the transmission operation TX in a short time after performing the exposure operation EX, which makes it possible for the controller 20 to timely acquire image data. Thus, in the drone 1, it is possible to enhance, for example, accuracy of arithmetic processing.

(About Exposure Frequency)

The exposure frequency setting section 26 sets the respective exposure frequencies of the six stereo cameras 100 on the basis of the six angles θ. The six stereo cameras 100 generate image data by performing the exposure operation on the basis of an instruction from the controller 20. The controller 20 performs processing on the basis of the image data generated by the six stereo cameras 100.

FIGS. 8A, 8B, 8C, 8D, 8E, 8F, 8G, and 8H illustrate an operation example of the controller 20, where FIGS. 8A, 8B, 8C, 8D, 8E, and 8F respectively indicate operations of the stereo cameras 100A, 100B, 100D, 100E, 100F, and 100C, FIG. 8G indicates an operation of the position-movement estimating section 25, and FIG. 8H indicates operations of the depth data generator 24 and the map data generator 31. In this example, a ratio of the exposure frequency of the stereo camera 100A, each of the exposure frequency of the stereo cameras 100B, 100D, 100E, and 100F, and the exposure frequency of the stereo camera 100C is 4:2:1.

In this example, as illustrated in FIGS. 8A, 8B, 8C, 8D, 8E, and 8F, the imaging section 11 performs the exposure operation in order of the stereo camera 100A, the stereo camera 100B, the stereo camera 100D, the stereo camera 100A, the stereo camera 100E, the stereo camera 100F, . . . . Accordingly, the stereo camera 100A performs the exposure operation at a rate of eight times for every 26 frames; the stereo cameras 100B, 100D, 100E, and 100F perform the exposure operation at a rate of four times for every 26 frames; and the stereo camera 100C performs the exposure operation at a rate of twice for every 26 frames.

The position-movement estimating section 25 performs processing on the basis of the supplied image data DT. That is, as illustrated in of FIG. 8G, the position-movement estimating section 25 first performs processing on the basis of the image data generated by the stereo camera 100A, and next performs processing on the basis of the image data generated by the stereo camera 100B; performs processing on the basis of the image data generated by the stereo camera 100D; performs processing on the basis of the image data generated by the stereo camera 100A; performs processing on the basis of the image data generated by the stereo camera 100E; and performs processing on the basis of the image data generated by the stereo camera 100F. The same applies thereafter.

The depth data generator 24 and the map data generator 31 perform processing on the basis of the supplied image data DT. That is, as illustrated in FIG. 8H, the depth data generator 24 and the map data generator 31 first perform processing on the basis of the image data generated by the stereo camera 100A, and next perform processing on the basis of the image data generated by the stereo camera 100B; perform processing on the basis of the image data generated by the stereo camera 100D; perform processing on the basis of the image data generated by the stereo camera 100A; perform processing on the basis of the image data generated by the stereo camera 100E; and performs processing on the basis of the image data generated by the stereo camera 100F. The same applies thereafter.

Thus, in the drone 1, each of the six stereo cameras 100 performs the exposure operation at substantially equal time intervals. Specifically, for example, the stereo camera 100A performs the exposure operation at a rate of once for every 3 to 4 frames; the stereo cameras 100B, 100D, 100E, and 100F perform the exposure operation at a rate of once for every 6 to 7 frames; and the stereo camera 100C performs the exposure operation at a rate of once for every 13 frames. This makes it possible for the drone 1 to grasp a surrounding environment accurately.

Effects

As described above, in the present embodiment, respective exposure frequencies of six stereo cameras are set on the basis of six angles θ, which makes it possible to effectively use computational resources.

In the present embodiment, in a case where the flight speed is faster than a predetermined speed, the respective exposure frequencies of the six stereo cameras are set on the basis of six angles θ, which makes it possible to effectively use the computational resources.

In the present embodiment, the exposure timings of the six stereo cameras are different from each other, which makes it possible to reduce delay, thereby making it possible to enhance, for example, accuracy of arithmetic processing.

Modification Example 1-1

In the embodiment described above, the exposure frequency setting section 26 increases the exposure frequency of the stereo camera 100 corresponding to the smallest angle θ among the six angles θ. At this time, the exposure frequency setting section 26 may increase the exposure frequency with an increase in the speed value indicated by the speed vector VS. Specifically, for example, in a case where the flight direction DIR is the same as the optical axis direction 101A of the stereo camera 100A, it is possible to set the ratio of the exposure frequency of the stereo camera 100A, each of the exposure frequencies of the stereo cameras 100B, 100D, 100E, and 100F, and the exposure frequency of the stereo camera 100C at 3:2:1 in a case where the speed is slow, and it is possible to set the ratio of the exposure frequency of the stereo camera 100A, each of the exposure frequencies of the stereo cameras 100B, 100D, 100E, and 100F, and the exposure frequency of the stereo camera 100C at 9:4:1 in a case where the speed is fast.

Modification Example 1-2

In the embodiment described above, the depth data generator 24 and the map data generator 31 perform processing in each frame, but this is not limitative. Instead of this, for example, as illustrated in FIGS. 9A, 9B, 9C, 9D, 9E, 9F, 9G, and 9H, there may be a frame in which the depth data generator 24 and the map data generator 31 do not perform processing. In this example, the position-movement estimating section 25 performs processing in each frame. In addition, the depth data generator 24 and the map data generator 31 do not perform processing at a rate of once for every 6 to 7 frames. In addition, for example, there may be a frame in which the position-movement estimating section 25 does not perform processing. In this example, the depth data generator 24 and the map data generator 31 perform processing in each frame.

Modification Example 1-3

In the embodiment described above, for example, as illustrated in FIGS. 8A, 8B, 8C, 8D, 8E, 8F, 8G, and 8H, the position-movement estimating section 25, the depth data generator 24, and the map data generator 31 perform processing on the basis of the same image data, but this is not limitative. Instead of this, for example, as illustrated in FIGS. 10A, 10B, 10C, 10D, 10E, 10F, 10G, and 10H, image data on which the position-movement estimating section 25 is to perform processing and image data on which the depth data generator 24 and the map data generator 31 are to perform processing may be different from each other. FIGS. 10A, 10B, 10C, 10D, 10E, and 10F respectively indicate operations of the stereo cameras 100A, 100B, 100D, 100E, 100F, and 100C; FIG. 10G indicates an operation of the position-movement estimating section 25; and FIG. 10H indicates operations of the depth data generator 24 and the map data generator 31. In FIGS. 10A, 10B, 10C, 10D, 10E, and 10F, a solid line indicates the stereo camera 100 that generates image data on which the depth data generator 24 and the map data generator 31 are to perform processing, and a broken line indicates the stereo camera 100 that generates image data on which the position-movement estimating section 25 is to perform processing. In this example, the position-movement estimating section 25 performs VIO processing at a rate of once for about every 2 frames on the basis of image data generated by the stereo camera 100F that performs imaging in the downward direction of the drone 1. For example, in a case where the exposure timings of two stereo cameras 100 coincide with each other, as illustrated in FIG. 7, a timing of the transmission operation TX is shifted. For example, in a case where there is a margin for a communication data amount in the bus wiring line 109, such as a case where the size of an image is small, exposure timings of a plurality of stereo cameras 100 may coincide with each other in such a manner.

Modification Example 1-4

In the embodiment described above, the controller 20 of the drone 1 controls flight of the drone 1 on the basis of data supplied from the imaging section 11, the GPS receiving section 12, the barometric pressure sensor 13, and the inertial measuring section 14, and performs processing for controlling the operation of the imaging section 11, but this is not limitative, and a device, other than the drone 1, such as a server and a control terminal may perform a part of this processing. An example in which a server performs a part of processing of the controller 20 is described in detail below.

FIG. 11 illustrates a configuration example of a drone 1A according to the present modification example. FIG. 12 illustrates a configuration example of a server 40 according to the present modification example. In the present modification example, the server 40 performs processing that is performed by the map data generator 31, the action planning section 32, and the route determining section 33 in the drone 1 (FIG. 1) according to the embodiment described above. The drone 1A includes a communication section 35A. The communication section 35A is configured to perform communication with the server 40 via wireless communication and the Internet. The server 40 includes a communication section 45, a map data generator 41, an action planning section 42, and a route determining section 43. The communication section 45 is configured to perform communication with the drone 1A via wireless communication and the Internet. The map data generator 41, the action planning section 42, and the route determining section 43 are similar to the map data generator 31, the action planning section 32, and the route determining section 33 according to the embodiment described above.

With this configuration, the communication section 35A of the drone 1A transmits the depth data DD and the position-movement data DPM to the server 40, and the communication section 45 of the server 40 receives the depth data DD and the position-movement data DPM. The map data generator 41 generates the map data MAP including an occupancy map on the basis of the depth data DD and the position-movement data DPM received by the communication section 45. The action planning section 42 plans the action of the drone 1 on the basis of a preset destination, and control instruction data transmitted from the control terminal. The route determining section 43 determines a flight route of the drone 1A on the basis of the map data MAP and a determination result of the action planning section 42. The communication section 45 transmits data about the flight route of the drone 1A to the drone 1A, and the communication section 35A of the drone 1A receives the data about the flight route. The airframe controller 34 controls an airframe of the drone 1A on the basis of the data about the flight route of the drone 1A received by the communication section 35A.

Other Modification Examples

In addition, two or more of these modification examples may be combined.

2. Second Embodiment

Next, description is given of a drone 2 according to a second embodiment. In the present embodiment, exposure frequencies are set on the basis of an environment around a drone in addition to the six angles θ. It is to be noted that components substantially the same as those of the drone 1 according to the first embodiment described above are denoted by the same reference numerals, and description thereof is omitted as appropriate.

FIG. 13 illustrates a configuration example of the drone 2. The drone 2 includes a controller 50. The controller 50 includes a map data generator 51 and an exposure frequency setting section 56.

The map data generator 51 is configured to generate the map data MAP including the occupancy map on the basis of the depth data DD and the position-movement data DPM, as with the map data generator 31 according to the first embodiment described above. In addition, the map data generator 51 confirms the width of a space around the drone 2 on the basis of the map data MAP, and supplies data about the width of the space as environment data DE to the exposure frequency setting section 56.

The exposure frequency setting section 56 is configured to set the exposure frequencies of the six stereo cameras 100 in the imaging section 11 on the basis of the speed vector VS included in the position-movement data DPM, as with the exposure frequency setting section 26 according to the first embodiment described above. In addition, the exposure frequency setting section 56 performs processing for correcting the set exposure frequencies on the basis of the environment data DE supplied from the map data generator 51. The exposure frequency setting section 56 then sets the respective exposure timing of the six stereo cameras 100 on the basis of the set exposure frequencies.

FIG. 14 illustrates an operation example of the drone 2. In this example, the drone 2 flies in a space that is narrow in a up-down direction. In this case, there are a narrow space in the up-down direction and a space in a right-left direction around the drone 2 flying in the flight direction DIR. In a case where there is the space in the right-left direction in such a manner, the drone 2 is movable in the right-left direction; therefore, in a case where, for example, an obstacle appears, in order to avoid the obstacle, the drone 2 is movable in the right-left direction. Accordingly, in order to grasp an environment in the right-left direction more accurately, the exposure frequency setting section 56 increases an exposure frequency in the right-left direction, and decreases an exposure frequency in the up-down direction. More specifically, for example, the exposure frequency setting section 56 is able to set exposure frequencies FF, FB, FU, FD, FL, and FR as follows, where FF represents an exposure frequency in the flight direction DIR; FB represents an exposure frequency in a direction opposite to the flight direction DIR; FU represents an exposure frequency in the upward direction; FD represents an exposure frequency in the downward direction; FL represents an exposure frequency in a leftward direction; and FR represents an exposure frequency in a rightward direction.

FF>FL=FR>FU=FD>FB

In this example, description has been given of a case where there are a narrow space in the up-down direction and a space in the right-left direction; however, for example, in a case where there are a narrow space in the right-left direction and a space in the up-down direction, the exposure frequency setting section 56 increases the exposure frequency in the up-down direction and decreases the exposure frequency in the right-left direction. Specifically, the exposure frequency setting section 56 is able to set the exposure frequencies FF, FB, FU, FD, FL, and FR as follows.

FF>FU=FD>FL=FR>FB

In contrast, in a case where the drone 2 is flying in a space with nothing, there are spaces in all directions around the drone 2. In such a case, the drone 2 is movable in all directions; therefore, in a case where, for example, an obstacle appears, in order to avoid the obstacle, the drone 2 is movable in any direction. Accordingly, the exposure frequency setting section 56 causes the exposure frequency in the right-left direction and the exposure frequency in the vertical direction to be substantially equal to each other. Specifically, the exposure frequency setting section 56 is able to set the exposure frequencies FF, FB, FU, FD, FL, and FR as follows.

FF>FL=FR=FU=FD>FB

Here, the depth data generator 24 and the map data generator 51 correspond to specific examples of an "environment information generator" in the present disclosure.

The map data MAP corresponds to a specific example of "environment information" in the present disclosure.

FIG. 15 illustrates an operation example of the controller 50. This flowchart is a flowchart formed by adding steps S205 to S207 to the flowchart (FIG. 4) of the controller 20 according to the first embodiment described above.

As with the first embodiment described above, the position-movement estimating section 25 calculates the speed vector VS of the drone 2 on the basis of the image data DT, the position data DP, and the inertia data DI (the step S101). Then, the exposure frequency setting section 56 confirms whether or not the speed value indicated by the speed vector VS is equal to or less than the threshold TH1 (the step S102).

In the step S102, in a case where the speed value is not equal to or less than the threshold TH1 ("N" in the step S102), the exposure frequency setting section 56 calculates the angle θ between the flight direction DIR of the drone 2 indicated by the speed vector VS and the optical axis direction 101 of each of the six stereo cameras 100 (the step S103). Then, the exposure frequency setting section 56 sets the respective exposure frequencies of the six stereo cameras 100 on the basis of six angles θ (the step S104).

Next, the map data generator 51 confirms spaces in the up-down direction and the right-left direction on the basis of the map data MAP (step S205).

Next, the exposure frequency setting section 56 confirms whether or not a space in the up-down direction or the right-left direction is narrow (step S206). In a case where there are spaces in both the up-down direction and the right-left direction or in a case where both spaces in the up-down direction and the right-left direction are narrow ("N" in the step S206), the flow proceeds to processing in the step S106.

In the step S206, in a case where a space in the up-down direction or the right-left direction is narrow ("Y" in the step S206), the exposure frequency setting section 56 corrects the respective exposure frequencies of the six stereo cameras 100 that are set in the step S104 (step S207). For example, in a case where there are a narrow space in the up-down direction and a space in the right-left direction, the exposure frequency setting section 56 increases the exposure frequency in the right-left direction and decreases the exposure frequency in the up-down direction. In addition, for example, in a case where there are a narrow space in the right-left direction and a space in the up-down direction, the exposure frequency setting section 56 increases the exposure frequency in the up-down direction and decreases the exposure frequency in the right-left direction. Then, the exposure frequency setting section 56 sets respective exposure timings of the six stereo cameras 100 on the basis of the set exposure frequencies. Then, the flow proceeds to the processing in the step S106.

The following steps are similar to those in the first embodiment described above.

Thus, in the drone 2, the respective exposure frequencies of the six stereo cameras 100 are set on the basis of the map data MAP that indicates an environment around the drone 2. Accordingly, in the drone 2, for example, in a case where there are a narrow space in the up-down direction and a space in the right-left direction, it is possible to increase the exposure frequency in the right-left direction and decrease the exposure frequency in the up-down direction. Accordingly, in the drone 2, it is possible to grasp an environment in the right-left direction more accurately; therefore, for example, in a case where an obstacle appears, in order to avoid the obstacle, it is possible to appropriately move the drone 2 in the right-left direction. Thus, in the drone 2, for example, it is possible to allocate many of the computational resources of the controller 50 to arithmetic processing on image data acquired by imaging in the right-left direction, which makes it possible to grasp the environment more accurately while effectively using limited computational resources.

As described above, in the present embodiment, respective exposure frequencies of six stereo cameras are set on the basis of map data indicating an environment around the drone, which makes it possible to effectively use the computational resources. Other effects are similar to those in the first embodiment described above.

Modification Example 2-1

In the embodiment described above, the exposure frequencies are set on the basis of the width of a space around the drone 2, but this is not limitative. Instead of this, for example, image analysis processing may be performed on the basis of a captured image to confirm whether or not there is a possible obstacle to flight of the drone 2, and may set the exposure frequencies on the basis of a result of such confirmation. The present modification example is described in detail below.

FIG. 16 illustrates a configuration example of a drone 2A according to the present modification example. The drone 2A includes a controller 50A. The controller 50A includes an image analyzing section 58A, a map data generator 51A, and an exposure frequency setting section 56A.

The image analyzing section 58A is configured to analyze an imaging target on the basis of the image data DT by performing image analysis processing with use of a technique of semantic segmentation. Then, the image analyzing section 58A supplies a result of such analysis as segmentation data DS to the map data generator 51A.

The map data generator 51A is configured to generate map data MAP2 including a semantic occupancy map on the basis of the depth data DD, the position-movement data DPM, and the segmentation data DS. Specifically, the map data generator 31 performs a voting process for each voxel in the semantic occupancy map on the basis of information about a depth value included in the depth data DD and the position of the drone 1 included in the position-movement data DPM to generate the map data MAP2. The semantic occupancy map includes data about a correspondence relationship between each voxel and the imaging target. Specifically, for example, data indicating the imaging target such as the sky, the ground, and a tree is attached to each voxel. Then, the map data generator 51A confirms whether or not there is a possible obstacle to flight of the drone 2 on the basis of the map data MAP2, and supplies a result of such confirmation as environment data DE2 to the exposure frequency setting section 56A. Specifically, for example, in a case where there is a tree near the drone 2, a bird may come flying or fly away to become an obstacle to flight. In addition, for example, in a case where there is a door near the drone 2, a door may open to become an obstacle to flight of the drone 2. Accordingly, in this example, the map data generator 51A confirms whether or not there is a tree or a door nearby on the basis of the semantic occupancy map, and supplies a result of such confirmation as the environment data DE2 to the exposure frequency setting section 56A.

The exposure frequency setting section 56A is configured to set the exposure frequencies of the six stereo cameras 100 in the imaging section 11 on the basis of the speed vector VS included in the position-movement data DPM. In addition, the exposure frequency setting section 56A also performs processing for correcting the set exposure frequencies on the basis of the environment data DE2 supplied from the map data generator 51. Specifically, in a case where there is a possible obstacle to flight of the drone 2, the exposure frequencies are corrected to increase the exposure frequency of the stereo camera 100 that performs imaging of the possible obstacle. Then, the exposure frequency setting section 56A sets respective exposure timings of the six stereo cameras 100 on the basis of the set exposure frequencies.

Here, the image analyzing section 58A corresponds to a specific example of an "image analyzing section" in the present disclosure. The depth data generator 24 and the map data generator 51A correspond to specific examples of an "environment information generator" in the present disclosure. The map data MAP2 corresponds to a specific example of "environment information" in the present disclosure.

With this configuration, in the drone 2A, it is possible to increase the exposure frequency of the stereo camera 100 that performs imaging of the possible obstacle to flight, which makes it possible to grasp an environment more accurately, thereby making it possible to appropriately avoid an obstacle.

Modification Example 2-2

In the embodiment described above, the controller 50 of the drone 2 controls flight of the drone 2 on the basis of data supplied from the imaging section 11, the GPS receiving section 12, the barometric pressure sensor 13, and the inertial measuring section 14, and performs processing for controlling the operation of the imaging section 11, but this is not limitative, and a device, other than the drone 2, such as a server and a control terminal may perform a part of this processing. An example in which a server performs a part of processing of the controller 50 is described in detail below.

FIG. 17 illustrates a configuration example of a drone 2B according to the present modification example. FIG. 18 illustrates a configuration example of a server 60 according to the present modification example. In the present modification example, the server 60 performs processing that is performed by the map data generator 31, the action planning section 32, and the route determining section 33 in the drone 2 (FIG. 13) according to the embodiment described above. The drone 2B includes a communication section 35B. The communication section 35B is configured to perform communication with the server 60 via wireless communication and the Internet. The server 60 includes a communication section 65, a map data generator 61, the action planning section 42, and the route determining section 43. The communication section 65 is configured to perform communication with the drone 2B via wireless communication and the Internet. The map data generator 61, the action planning section 42, and the route determining section 43 are similar to the map data generator 51, the action planning section 32, and the route determining section 33 according to the embodiment described above.

With this configuration, the communication section 35B of the drone 2B transmits the depth data DD and the position-movement data DPM to the server 60, and the communication section 65 of the server 60 receives the depth data DD and the position-movement data DPM. The map data generator 61 generates the map data MAP including an occupancy map and generates the environment data DE on the basis of the depth data DD and the position-movement data DPM received by the communication section 65. The action planning section 42 plans an action of the drone 2B on the basis of a preset destination, and control instruction data transmitted from the control terminal. The route determining section 43 determines a flight route of the drone 2B on the basis of the map data MAP and a determination result of the action planning section 42. The communication section 65 transmits the environment data DE and data about the flight route of the drone 2BA to the drone 2B, and the communication section 35B of the drone 2B receives the environment data DE and the data about the flight route. The exposure frequency setting section 56 sets the exposure frequencies of the six stereo cameras 100 in the imaging section 11 on the basis of the speed vector VS included in the position-movement data DPM, and corrects the set exposure frequencies on the basis of the environment data DE received by the communication section 35B. The airframe controller 34 controls an airframe of the drone 2B on the basis of the data about the flight route of the drone 2BA received by the communication section 35B.

3. Third Embodiment

Next, description is given of a drone 3 according to a third embodiment. In the present embodiment, exposure frequencies are set on the basis of a mobile body around a drone in addition to the six angles θ. It is to be noted that components substantially the same as those of the drone 1 according to the first embodiment described above are denoted by the same reference numerals, and description thereof is omitted as appropriate.

FIG. 19 illustrates a configuration example of the drone 3. The drone 3 includes a controller 70. The controller 70 includes an object detector 78, a map data generator 71, a mobile body information analyzing section 79, and an exposure frequency setting section 76.

The object detector 78 is configured to detect an object that is a possible obstacle on the basis of the image data DT. Then, the object detector 78 supplies a result of such detection as object data DO to the map data generator 71.

The map data generator 71 is configured to generate the map data MAP including an occupancy map on the basis of the depth data DD, the position-movement data DPM, and the object data DO.

The mobile body information analyzing section 79 is configured to analyze a position and movement of the object detected by the object detector 78 with reference to the drone 3 on the basis of the depth data DD, the position-movement data DPM, and the object data DO. Then, the mobile body information analyzing section 79 supplies a result of such analysis as mobile body data DM to the exposure frequency setting section 76.

The exposure frequency setting section 76 is configured to set the exposure frequencies of the six stereo cameras 100 in the imaging section 11 on the basis of the speed vector VS included in the position-movement data DPM, as with the exposure frequency setting section 26 according to the first embodiment described above. In addition, in a case where the detected object is approaching the drone 3, the exposure frequency setting section 76 also performs processing for correcting the set exposure frequencies on the basis of the mobile body data DM supplied from the mobile body information analyzing section 79 to increase the exposure frequency of the stereo camera 100 that performs imaging of the object. Then, the exposure frequency setting section 76 sets the respective exposure timings of the six stereo cameras 100 on the basis of the set exposure frequencies.

FIG. 20 illustrates an operation example of the drone 3. In this example, a bird 99 flies around the drone 3, and the bird 99 is approaching the drone 9. That is, a speed vector V99 of the bird 99 with reference to the drone 3 is directed to the direction of the drone 3.

The exposure frequency setting section 76 calculates an angle ϕ between a direction opposite to a direction indicated by the speed vector V99 and the optical axis direction 101 of each of the six stereo cameras 100. Specifically, as with a case in FIG. 5, the exposure frequency setting section 76 calculates an angle ϕA between the direction opposite to the direction indicated by the speed vector V99 and the optical axis direction 101A of the stereo camera 100A; calculates an angle ϕB between the direction opposite to the direction indicated by the speed vector V99 and the optical axis direction 101B of the stereo camera 100B; calculates an angle ϕC between the direction opposite to the direction indicated by the speed vector V99 and the optical axis direction 101C of the stereo camera 100C; calculates an angle ØD between the direction opposite to the direction indicated by the speed vector V99 and the optical axis direction 101D of the stereo camera 100D; calculates an angle DE between the direction opposite to the direction indicated by the speed vector V99 and the optical axis direction 101E of the stereo camera 100E; and calculates an angle ϕF between the direction opposite to the direction indicated by the speed vector V99 and the optical axis direction 101F of the stereo camera 100F. The angle ϕ is an angle smaller than 180 degrees.

Then, the exposure frequency setting section 76 sets the exposure frequencies to increase the exposure frequency of the stereo camera 100 corresponding to the smallest angle ϕ among the six angles ϕ. Specifically, for example, in an example in FIG. 14, the exposure frequency setting section 76 is able to set exposure frequencies F100 as follows, where F100A to F100D respectively represent the exposure frequencies of the stereo cameras 100A to 100D.

F100B>F100A>F100C>F100D

Here, the object detector 78 and the mobile body information analyzing section 79 correspond to specific examples of a "mobile body detector" in the present disclosure.

FIG. 21 illustrates an operation example of the controller 70. This flowchart is a flowchart formed by adding steps S305 to S307 to the flowchart (FIG. 4) of the controller 20 according to the first embodiment described above.

As with the first embodiment described above, the position-movement estimating section 25 calculates the speed vector VS of the drone 3 on the basis of the image data DT, the position data DP, and the inertia data DI (the step S101). Then, the exposure frequency setting section 76 confirms whether or not the speed value indicated by the speed vector VS is equal to or less than the threshold TH1 (the step S102).

In the step S102, in a case where the speed value is not equal to or less than the threshold TH1 ("N" in the step S102), the exposure frequency setting section 76 calculates the angle θ between the flight direction DIR of the drone 3 indicated by the speed vector VS and the optical axis direction 101 of each of the six stereo cameras 100 (the step S103). Then, the exposure frequency setting section 76 sets the respective exposure frequencies of the six stereo cameras 100 on the basis of six angles θ (the step S104).

Next, the mobile body information analyzing section 79 analyzes an position and movement of an object detected by the object detector 78 with reference to the drone 3 on the basis of the depth data DD, the position-movement data DPM, and the object data DO (step S305).

Next, the exposure frequency setting section 76 confirms whether or not there is an approaching object on the basis of an analysis result of the mobile body information analyzing section 79 (step S306). In a case where there is no approaching object ("N" in the step S306), the flow proceeds to the processing in the step S106.

In the step S306, in a case where there is an approaching object ("Y" in the step S306), the exposure frequency setting section 76 corrects the respective exposure frequencies of the six stereo camera 100 to increase the exposure frequency of the stereo camera 100 that performs imaging of the object of the six stereo cameras 100 (step S307). For example, the exposure frequency setting section 76 calculates the angle ϕ between the direction opposite to the direction indicated by the speed vector V99 and the optical axis direction 101 of each of the six stereo cameras 100, and sets the exposure frequencies to increase the exposure frequency of the stereo camera 100 corresponding to the smallest angle ϕ among the six angles ϕ. Then, the exposure frequency setting section 76 sets the respective exposure timings of the six stereo cameras 100 on the basis of the set exposure frequencies. Then, the flow proceeds to the processing in the step S106.

The following steps are similar to those in the first embodiment described above.

Thus, in the drone 3, the respective exposure frequencies of the six stereo cameras 100 are set on the basis of processing results of the object detector 78 and the mobile body information analyzing section 79. Accordingly, in the drone 3, for example, in a case where an object is approaching, it is possible to increase the exposure frequency of the stereo camera 100 that performs imaging of the object. Accordingly, in the drone 3, it is possible to grasp an environment including the approaching object more accurately, which makes it possible to appropriately avoid the object. Thus, in the drone 3, for example, it is possible to allocate many of the computational resources of the controller 70 to arithmetic processing on image data acquired by imaging of an approaching object, which makes it possible to grasp the environment more accurately while effectively using limited computational resources.

As described above, in the present embodiment, respective exposure frequencies of six stereo cameras are set on the basis of processing results of the object detector and the mobile body information analyzing section, which makes it possible to effectively use the computational resources. Other effects are similar to those in the first embodiment described above.

Modification Example 3

Any of the modification examples of the first and second embodiments described above may be applied to the drone 3 according to the embodiment described above.

4. Fourth Embodiment

Next, description is given of a drone 4 according to a fourth embodiment. In the present embodiment, exposure frequencies are set on the basis of an overlap rate between image regions of captured images acquired at exposure timings different from each other, in addition to the six angles θ. It is to be noted that components substantially the same as those of the drone 1 according to the first embodiment described above are denoted by the same reference numerals, and description thereof is omitted as appropriate.

FIG. 22 illustrates a configuration example of the drone 4. The drone 4 includes a controller 80. The controller 80 includes an exposure frequency setting section 86.

As with the exposure frequency setting section 26 according to the first embodiment described above, the exposure frequency setting section 86 is configured to set the exposure frequencies of the six stereo cameras 100 in the imaging section 11 on the basis of the speed vector VS included in the position-movement data DPM. In addition, the exposure frequency setting section 86 calculates an overlap rate between image regions in captured images acquired at exposure timings different from each other in each of the six stereo cameras 100 on the basis of the depth data DD and the position-movement data DPM, and also performs processing for correcting the set exposure frequencies on the basis of the overlap rate. Then, the exposure frequency setting section 86 sets the respective exposure timings of the six stereo cameras 100 on the basis of the set exposure frequencies.

FIG. 23 illustrates an operation example of the drone 4. In this example, the stereo camera 100F that performs imaging in a downward direction of the drone 4 performs an exposure operation twice at exposure timings different from each other. The drone 4 is moving, which causes an image region W1 in a first exposure operation EX and an image region W2 in a second exposure operation EX to be shifted without coinciding with each other. Accordingly, a portion of the image region W1 and a portion of the image region W2 overlap each other as illustrated in FIG. 23. In particular, in a case where a moving speed of the drone 4 is fast or in a case where a distance from the drone 4 to an imaging target is short, image regions overlapping each other are widened. The exposure frequency setting section 86 calculates an overlap rate indicating the degree of overlap between the image regions on the basis of the moving speed of the drone 4 and the distance from the drone 4 to the imaging target. Then, in a case where an overlap rate between image regions in captured images captured by the stereo camera 100F is low, the exposure frequency setting section 86 increases the exposure frequency of the stereo camera 100F to increase the overlap rate.

Here, the depth data generator 24 corresponds to a specific example of a "distance calculating section" in the present disclosure.

FIG. 24 illustrates an operation example of the controller 80. This flowchart is a flowchart formed by adding steps S305 to S307 to the flowchart (FIG. 4) of the controller 20 according to the first embodiment described above.

As with the first embodiment described above, the position-movement estimating section 25 calculates the speed vector VS of the drone 4 on the basis of the image data DT, the position data DP, and the inertia data DI (the step S101). Then, the exposure frequency setting section 56 confirms whether or not the speed value indicated by the speed vector VS is equal to or less than the threshold TH1 (the step S102).

In the step S102, in a case where the speed value is not equal to or less than the threshold TH1 ("N" in the step S102), the exposure frequency setting section 76 calculates the angle θ between the flight direction DIR of the drone 4 indicated by the speed vector VS and the optical axis direction 101 of each of the six stereo cameras 100 (the step S103). Then, the exposure frequency setting section 76 sets the respective exposure frequencies of the six stereo cameras 100 on the basis of six angles θ (the step S104).

Next, the exposure frequency setting section 86 calculates an overlap rate between image regions in captured images acquired at exposure timings different from each other in each of the six stereo cameras 100 on the basis of the moving speed of the drone 4 and the distance from the drone 4 to the imaging target (step S405). Specifically, the exposure frequency setting section 86 calculates an overlap rate in the stereo camera 100A; calculates an overlap rate in the stereo camera 100B; calculates an overlap rate in the stereo camera 100C; calculates an overlap rate in the stereo camera 100D; calculates an overlap rate in the stereo camera 100E; and calculates an overlap rate in the stereo camera 100F.

Next, the exposure frequency setting section 86 confirms whether or not at least one of the overlap rates in the six stereo cameras 100 is equal to or less than a threshold TH2 (step S406). In a case where all the overlap rates are not equal to or less than the threshold TH2 ("N" in the step S406), the flow proceeds to the processing in the step S106.

In the step S406, in a case where at least one of the overlap rates in the six stereo cameras 100 is equal to or less than the threshold TH2 ("Y" in the step S406), the exposure frequency setting section 86 corrects the respective exposure frequencies of the six stereo cameras 100 to cause the overlap rate that is equal to or less than the threshold TH2 to exceed the threshold TH2 (step S407). Then, the exposure frequency setting section 86 sets the respective exposure timings of the six stereo cameras 100 on the basis of the set exposure frequencies. Then, the flow proceeds to the processing in the step S106.

The following steps are similar to those in the first embodiment described above.

Thus, in the drone 4, the respective exposure frequencies of the six stereo cameras 100 are set on the basis of the moving speed of the drone 4 and the distance from the drone 4 to the imaging target. Accordingly, for example, in a case where the overlap rate between image regions is low, in the drone 4, it is possible to increase the exposure frequency of the stereo camera 100 in which the overlap rate is low. Accordingly, in the drone 4, it is possible to increase the overlap rate between image regions, which makes it possible to enhance accuracy of VIO processing in the position-movement estimating section 25, thereby making it possible to enhance accuracy of estimation of the position and movement of the drone 4.

As described above, in the present embodiment, respective exposure frequencies of six stereo cameras are set on the basis of the moving speed of the drone and the distance from the drone to the imaging target, which makes it possible to enhance accuracy of estimation of the position and movement of the drone. Other effects are similar to those in the first embodiment described above.

Modification Example 4

Each of the modification examples of the first and second embodiments described above may be applied to the drone 4 according to the embodiment described above.

Although the present technology has been described above with reference to some embodiments and modification examples, the present technology is not limited to these embodiments and the like, and may be modified in a variety of ways.

For example, in the embodiments described above, six stereo cameras 100 are provided, but this is not limitative. Instead of this, two or more and five or less stereo cameras 100 may be provided, or seven or more stereo cameras 100 may be provided.

For example, in the embodiments described above, the GPS receiving section 12, the barometric pressure sensor 13, and the inertial measuring section 14 are provided, but this is not limitative, and some of them may be omitted.

In addition, in the embodiments described above, the present technology is applied to drones, but this is not limitative. Instead of this, the present technology may be applied to, for example, a robot that travels on plane information.

It is to be noted that the effects described herein are merely illustrative and non-limiting, and other effects may be included.

It is to be noted that the present technology may have the following configurations. According to the present technology having the following configurations, it is possible to effectively use computational resources.

(1)
An exposure control device including:
a setting section that calculates a camera angle between a moving direction of an device including a plurality of stereo cameras and an optical axis direction of each of the plurality of stereo cameras, and sets an exposure frequency of each of the plurality of stereo cameras on the basis of a plurality of the camera angles; and
an exposure controller that controls operations of the plurality of stereo cameras on the basis of a plurality of the exposure frequencies set by the setting section.

(2)
The exposure control device according to (1), in which in a case where a moving speed of the device including the plurality of stereo cameras is faster than a predetermined speed, the setting section sets the exposure frequency of each of the plurality of stereo cameras on the basis of the plurality of camera angles.

(3)
The exposure control device according to (1) or (2), in which the setting section causes the exposure frequency of a first stereo camera having the smallest camera angle of the plurality of stereo cameras to be higher than the exposure frequency of a second stereo camera different from the first stereo camera of the plurality of stereo cameras.

(4)
The exposure control device according to (3), in which
in a case where a moving speed of the device including the plurality of stereo cameras is a first speed, the setting section sets the exposure frequency of the first stereo camera to a first exposure frequency, and
in a case where the moving speed of the device including the plurality of stereo cameras is a second speed that is faster than the first speed, the setting section sets the exposure frequency of the first stereo camera to a second exposure frequency that is higher than the first exposure frequency.

(5)
The exposure control device according to any one of (1) to (4), further including an environment information generator that generates environment information about surroundings of the device including the plurality of stereo cameras on the basis of imaging results of the plurality of stereo cameras, in which
the setting section sets the exposures frequency of each of the plurality of stereo cameras on the basis of the environment information in addition to the plurality of camera angles.

(6)
The exposure control device according to (5), in which the setting section detects a width of a space in the surroundings on the basis of the environment information, and causes the exposure frequency of a third stereo camera that performs imaging in a direction in which the space is wide of the plurality of stereo cameras to be higher than the exposure frequency of a fourth stereo camera different from the third stereo camera of the plurality of stereo cameras.

(7)
The exposure control device according to (5), further including an image analyzing section that analyzes an imaging target on the basis of imaging results of the plurality of stereo cameras, in which
the environment information includes information about the imaging target.

(8)
The exposure control device according to any one of (1) to (4), further including a mobile body detector that detects a mobile body around the device including the plurality of stereo cameras on the basis of imaging results of the plurality of stereo cameras, in which
the setting section sets the exposure frequency of each of the plurality of stereo cameras on the basis of a detection result of the mobile body detector in addition to the plurality of camera angles.

(9)
The exposure control device according to (8), in which in a case where a distance between the mobile body and the device including the plurality of stereo cameras is narrowed, the setting section causes the exposure frequency of a fifth stereo camera that performs imaging of the mobile body of the plurality of stereo cameras to be higher than the exposure frequency of a sixth stereo camera different from the fifth stereo camera of the plurality of stereo cameras.

(10)
The exposure control device according to any one of (1) to (4), further including a distance calculating section that calculates a distance to an imaging target on the basis of imaging results of the plurality of stereo cameras, in which
the setting section sets the exposure frequency of each of the plurality of stereo cameras on the basis of a moving speed of the device including the plurality of stereo cameras and the distance to the imaging target in addition to the plurality of camera angles.

(11)
The exposure control device according to (10), in which the setting section calculates an overlap rate between image regions of two captured images different in exposure timing from each other in one stereo camera of the plurality of stereo cameras on the basis of the moving speed of the device including the plurality of stereo cameras and the distance to the imaging target, and increases the exposure frequency of the one stereo camera in a case where the overlap rate is lower than a predetermined value.

(12)
The exposure control device according to any one of (1) to (11), in which
the setting section sets an exposure timing of each of the plurality of stereo cameras on the basis of the exposure frequency of each of the plurality of stereo cameras, and
the exposure controller controls operations of the plurality of stereo cameras on the basis of a plurality of the exposure timings set by the setting section.

(13)
The exposure control device according to (12), in which the setting section sets the exposure timing of each of the plurality of stereo cameras to cause the exposure timings of the plurality of stereo cameras to be different from each other.

(14)
The exposure control device according to (12) or (13), further including an image acquiring section that acquires imaging results of the plurality of stereo cameras via a single bus wiring line coupled to the plurality of stereo cameras, in which
the image acquiring section acquires the imaging results of the plurality of stereo cameras in periods different from each other.

(15)
The exposure control device according to (14), in which each of the plurality of stereo cameras includes a plurality of image sensors,
the exposure timings of the plurality of image sensors are same as each other, and
the image acquiring section acquires the imaging results of the plurality of image sensors in periods different from each other.

(16)
An exposure control method including:
calculating a camera angle between a moving direction of an device including a plurality of stereo cameras and an optical axis direction of each of the plurality of stereo cameras, and setting an exposure frequency of each of the plurality of stereo cameras on the basis of a plurality of the camera angles, and
controlling operations of the plurality of stereo cameras on the basis of a plurality of the set exposure frequencies.

This application claims the benefit of Japanese Priority Patent Application JP2020-011031 filed with the Japan Patent Office on Jan. 27, 2020, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An exposure control device, comprising:
a setting section configured to:
calculate a plurality of camera angles, wherein
a camera angle of the plurality of camera angles is between a direction of a device including a plurality of stereo cameras and an optical axis direction of a stereo camera of the plurality of stereo cameras;
set an exposure frequency of the stereo camera of the plurality of stereo cameras, based on the camera angle of the stereo camera; and
an exposure controller configured to control an operation of the stereo camera based on the set exposure frequency.

2. The exposure control device according to claim 1, wherein in a case where a moving speed of the device including the plurality of stereo cameras is faster than a specific speed, the setting section is further configured to set the exposure frequency of the stereo camera based on the camera angle.

3. The exposure control device according to claim 1, wherein the setting section is further configured to cause the exposure frequency of a first stereo camera having a smallest camera angle of the plurality of stereo cameras to be higher than the exposure frequency of a second stereo camera different from the first stereo camera of the plurality of stereo cameras.

4. The exposure control device according to claim 3, wherein
in a case where a moving speed of the device including the plurality of stereo cameras is a first speed, the setting section is further configured to set the exposure frequency of the first stereo camera to a first exposure frequency, and
in a case where the moving speed of the device including the plurality of stereo cameras is a second speed that is faster than the first speed, the setting section is further configured to set the exposure frequency of the first stereo camera to a second exposure frequency higher than the first exposure frequency.

5. The exposure control device according to claim 1, further comprising an environment information generator configured to generate environment information about surroundings of the device including the plurality of stereo cameras, based on imaging results of the plurality of stereo cameras, wherein
the setting section is further configured to set the exposure frequency of the stereo camera of the plurality of stereo cameras, based on the environment information and camera angle.

6. The exposure control device according to claim 5, wherein the setting section is further configured to:
detect a width of a space in the surroundings based on the environment information, and
cause the exposure frequency of a third stereo camera, configured to perform imaging in a direction in which the space is wide, of the plurality of stereo cameras to be higher than the exposure frequency of a fourth stereo camera, different from the third stereo camera, of the plurality of stereo cameras.

7. The exposure control device according to claim 5, further comprising an image analyzing section configured to analyze an imaging target based on the imaging results of the plurality of stereo cameras, wherein
the environment information includes information about the imaging target.

8. The exposure control device according to claim 1, further comprising a mobile body detector configured to detect a mobile body around the device including the plurality of stereo cameras based on imaging results of the plurality of stereo cameras, wherein
the setting section further configured to set the exposure frequency of the stereo camera of the plurality of stereo cameras, based on a detection result of the mobile body detector and the camera angle.

9. The exposure control device according to claim 8, wherein in a case where a distance between the mobile body and the device including the plurality of stereo cameras is narrowed, the setting section is further configured to cause the exposure frequency of a fifth stereo camera, configured to perform imaging of the mobile body, of the plurality of stereo cameras to be higher than the exposure frequency of a sixth stereo camera, different from the fifth stereo camera, of the plurality of stereo cameras.

10. The exposure control device according to claim 1, further comprising a distance calculating section configured to calculate a distance to an imaging target based on imaging results of the plurality of stereo cameras, wherein
the setting section is further configured to set the exposure frequency of the stereo camera of the plurality of stereo cameras, based on a moving speed of the device including the plurality of stereo cameras, the distance to the imaging target, and camera angle.

11. The exposure control device according to claim 10, wherein the setting section is further configured to:
calculate an overlap rate between image regions of two captured images different in an exposure timing from each other in at least one stereo camera of the plurality of stereo cameras, based on the moving speed of the device and the distance to the imaging target, and increase the exposure frequency of the at least one stereo camera in a case where the overlap rate is lower than a specific value.

12. The exposure control device according to claim 1, wherein the setting section is further configured to set an exposure timing of the stereo camera of the plurality of stereo cameras based on the exposure frequency of the stereo camera of the plurality of stereo cameras, and the exposure controller is further configured to control the operation of the stereo camera based the set exposure timing of the stereo camera.

13. The exposure control device according to claim 12, wherein a plurality of exposure timings of the plurality of stereo cameras are different.

14. The exposure control device according to claim 12, further comprising an image acquiring section configured to acquire imaging results of the plurality of stereo cameras via a single bus wiring line coupled to the plurality of stereo cameras, wherein the image acquiring section is further configured to acquire the imaging results of the plurality of stereo cameras in periods different from each other.

15. The exposure control device according to claim 14, wherein each of the plurality of stereo cameras includes a plurality of image sensors, and a plurality of exposure timings of the plurality of image sensors are same.

16. An exposure control method, comprising:

calculating a plurality of camera angles, wherein a camera angle of the plurality of camera angles is between a direction of a device including a plurality of stereo cameras and an optical axis direction of a stereo camera of the plurality of stereo cameras, setting an exposure frequency of the stereo camera of the plurality of stereo cameras, based on the camera angle of the stereo camera, and controlling an operation of the stereo camera based on the set exposure frequency.

* * * * *